(12) United States Patent
Negoita et al.

(10) Patent No.: US 12,730,508 B1
(45) Date of Patent: Sep. 8, 2026

(54) COMFORTABLE DISPLAY OF CONTENT

(71) Applicant: Apple Inc., Cupertino, CA (US)

(72) Inventors: Ioana Negoita, Mountain View, CA (US); Allison W. Dryer, Tiburon, CA (US); Trent A. Greene, Santa Clara, CA (US); David Loewenthal, Seattle, WA (US); Thomas G. Salter, San Francisco, CA (US); Thomas J. Moore, Northglenn, CO (US); Ian Perry, San Jose, CA (US); Brian W. Temple, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/885,029

(22) Filed: Sep. 13, 2024

Related U.S. Application Data

(60) Provisional application No. 63/585,515, filed on Sep. 26, 2023.

(51) Int. Cl.
*G06F 3/01* (2006.01)

(52) U.S. Cl.
CPC .................................... *G06F 3/013* (2013.01)

(58) Field of Classification Search
CPC .. G06F 3/013; G06F 3/04815; G06F 3/04842; G06F 3/0484
See application file for complete search history.

(56) References Cited

U.S. PATENT DOCUMENTS 9,619,105 B1 4/2017 Dal Mutto
9,696,855 B2 7/2017 Watanabe et al.
9,977,496 B2 5/2018 Maltz
10,353,532 B1 7/2019 Holz et al.
(Continued)

FOREIGN PATENT DOCUMENTS

CA 3042535 A1 5/2018
KR 10-2023-0087756 A 6/2023
WO 2016/105166 A1 6/2016

OTHER PUBLICATIONS

App Experience Spartan Trailer, Klocked Fitness, 2022 [online] [video]. [retrieved on Dec. 19, 2024], Retrieved from the Internet: <https://www.klocked.me/>, 12 pages.
(Continued)

*Primary Examiner* — Scott D Au
(74) *Attorney, Agent, or Firm* — Kubota & Basol LLP

(57) ABSTRACT

Some examples are directed to systems and methods for displaying content at an electronic device in communication with display(s) and input device(s). The method can include displaying content at a first apparent depth in a computer-generated environment relative to a viewpoint of the user. The first apparent depth is selected in accordance with a measure of a depth of a fixation point of the user during a first time period. The method can include updating the display of the content while displaying the content and in response to detecting motion of the electronic device in a physical environment of the electronic device. Updating the display of the content can include displaying the content at a second apparent depth different from the first apparent depth in the computer-generated environment relative to the viewpoint of the user in accordance with a determination that the motion satisfies one or more criteria.

24 Claims, 12 Drawing Sheets

(56) References Cited

U.S. PATENT DOCUMENTS 10,607,413 B1 3/2020 Marcolina et al.
10,712,919 B2 7/2020 Lee et al.
10,838,490 B2 11/2020 Pace et al.
11,145,126 B1 10/2021 Bramwell et al.
11,150,777 B2 10/2021 Kaehler et al.
11,170,521 B1 11/2021 Ben Himane et al.
11,278,810 B1 3/2022 Sarria et al.
11,335,066 B2 * 5/2022 Ha .......................... G06F 3/011
11,811,876 B2 11/2023 Berliner et al.
11,853,533 B1 12/2023 Chor et al.
11,948,263 B1 4/2024 Rudman et al.
12,094,070 B2 9/2024 Terre et al.
12,190,579 B2 1/2025 Gotoh et al.
12,353,627 B2 7/2025 Choi et al.
2007/0035563 A1 2/2007 Biocca et al.
2012/0075168 A1 3/2012 Osterhout et al.
2012/0306768 A1 12/2012 Bailey
2013/0335573 A1 12/2013 Forutanpour et al.
2015/0309264 A1 10/2015 Abovitz et al.
2016/0026253 A1 1/2016 Bradski et al.
2016/0257000 A1 9/2016 Guerin et al.
2017/0343811 A1 11/2017 Mese et al.
2018/0021629 A1 1/2018 Deluca et al.
2018/0046363 A1 2/2018 Miller et al.
2018/0053337 A1 2/2018 Nakashima et al.
2018/0095636 A1 4/2018 Valdivia et al.
2018/0157398 A1 6/2018 Kaehler et al.
2018/0173323 A1 6/2018 Harvey et al.
2018/0189354 A1 7/2018 Paine et al.
2018/0239144 A1 8/2018 Woods et al.
2018/0300897 A1 10/2018 Woods et al.
2018/0350150 A1 12/2018 Powderly et al.
2019/0004618 A1 1/2019 Tadros et al.
2019/0026936 A1 1/2019 Gorur Sheshagiri et al.
2019/0065027 A1 2/2019 Hauenstein et al.
2019/0108578 A1 4/2019 Spivack et al.
2019/0311539 A1 10/2019 Hogue
2019/0340649 A1 11/2019 Ayush et al.
2019/0366154 A1 12/2019 Callaghan
2019/0371279 A1 * 12/2019 Mak ....................... G09G 5/373
2019/0378204 A1 12/2019 Ayush et al.
2020/0035012 A1 * 1/2020 Mullins ................... G06T 19/20
2020/0357300 A1 11/2020 Galasso et al.
2020/0410766 A1 12/2020 Swaminathan
2021/0096726 A1 4/2021 Faulkner et al.
2021/0097776 A1 4/2021 Faulkner et al.
2021/0168270 A1 6/2021 Browne
2021/0192847 A1 6/2021 Nagaraja
2022/0027115 A1 1/2022 Haapoja et al.
2022/0072381 A1 3/2022 Trehan
2022/0101593 A1 * 3/2022 Rockel .................. A63F 13/655
2022/0129066 A1 4/2022 Zahnert et al.
2023/0145066 A1 5/2023 Jeong et al.
2023/0256297 A1 8/2023 Canberk et al.
2023/0396752 A1 12/2023 Jansen dos Reis
2023/0403460 A1 12/2023 Bethurum et al.
2024/0061547 A1 2/2024 Fleizach et al.
2024/0087256 A1 3/2024 Hylak et al.
2024/0144619 A1 5/2024 Heitger
2024/0193892 A1 6/2024 Lutter et al.
2024/0338909 A1 10/2024 Miller et al.
2025/0076970 A1 3/2025 Omata et al.
2025/0090934 A1 3/2025 Negoita et al.
2025/0094016 A1 3/2025 Negoita et al.

OTHER PUBLICATIONS

Budhiraja, et al., “Interaction Techniques for HMD-HHD Hybrid AR Systems”, 2013 IEEE International Symposium on Mixed and Augmented Reality, Australia, Oct. 1-4, 2013, <DOI: 10.1109/ISMAR.2013.6671786>, pp. 243-244.
Dirks, Brent, “What Is Action Mode on iPhone 14 and iPhone 14 Pro?”, (See Walking Test video at 1:17), Muo, Oct. 15, 2022 [online]. Retrieved from https://www.makeuseof.com/what-is-action-mode-iphone-14-pro/, [retrieved on Jan. 29, 2025], 6 pages.
Matsuda, Keiichi, Hyper-Reality, 2016 [online]. [retrieved on Jan. 30, 2025], Retrieved from the Internet: <http://hyper-reality.co/>, 2016, 6 pages.
Non-Final Office Action received for U.S. Appl. No. 18/824,823, mailed on Oct. 1, 2025, 36 pages.
Non-Final Office Action received for U.S. Appl. No. 18/823,550, mailed on Feb. 12, 2026, 15 pages.
Notice of Allowance received for U.S. Appl. No. 18/824,823, mailed on Feb. 23, 2026, 6 pages.

* cited by examiner

COMFORTABLE DISPLAY OF CONTENT

CROSS-REFERENCE TO RELATED APPLICATIONS

This application claims the benefit of U.S. Provisional Application No. 63/585,515, filed Sep. 26, 2023, the entire disclosure of which is herein incorporated by reference for all purposes.

FIELD OF THE DISCLOSURE

This relates generally to systems and methods for displaying content, and in particular, to devices, systems, and methods for displaying and updating content in a three-dimensional environment.

BACKGROUND OF THE DISCLOSURE

Some electronic devices include displays for displaying content at an apparent depth relative to a viewpoint of the user.

SUMMARY OF THE DISCLOSURE

Systems and methods for displaying content at an electronic device in communication with one or more displays and one or more input devices are described below. The electronic device can be configured to display content and update the display of the content in response to detecting motion of the electronic device and in accordance with a determination that the motion satisfies one or more criteria. Additionally or alternatively, the electronic device can be configured to display content and update the display of the content in response to detecting a change in location of gaze of the user and in accordance with a determination that the change in the location of the gaze satisfies one or more second criteria.

In some examples, the electronic device displays content at a first apparent depth in a computer-generated environment relative to a viewpoint of the user. The content can be displayed via the one or more displays. The first apparent depth can be selected in accordance with a measure of a depth of a fixation point of the user during a first time period. In some examples, while displaying the content, the electronic device updates the display of the content in response to detecting motion of the electronic device in a physical environment of the electronic device. For example, updating the display of the content can include displaying the content at a second apparent depth different from the first apparent depth in the computer-generated environment relative to the viewpoint of the user. In some examples, the electronic devices update the display of the content to display the content at the second apparent depth in accordance with a determination that the motion satisfies one or more first criteria. In some examples, the electronic devices update the display of the content to display the content at the second apparent depth in accordance with a determination that the change in the location of the gaze satisfies one or more second criteria.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
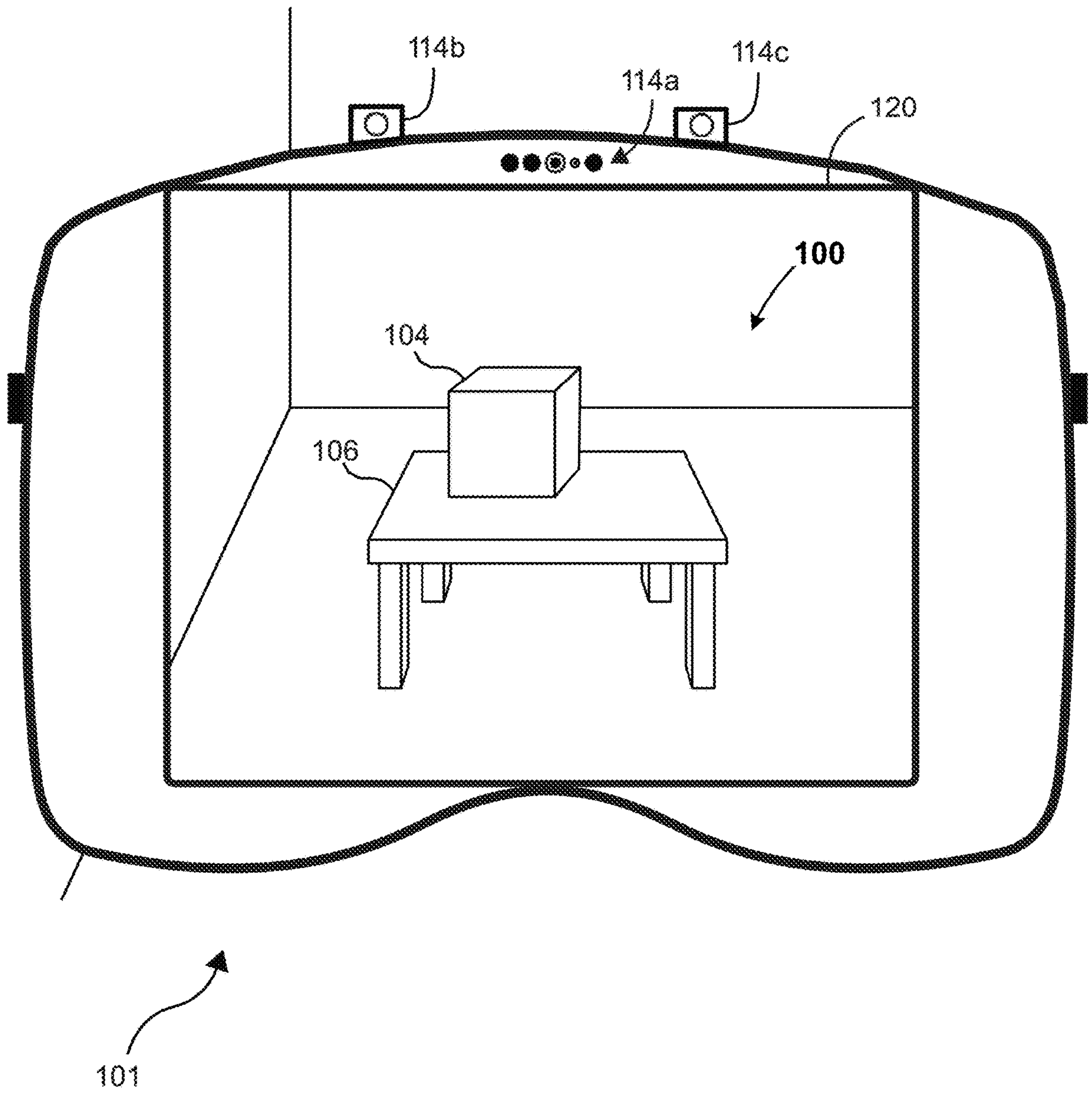
FIG. 1 illustrates an electronic device presenting an extended reality environment according to some examples of the disclosure.

Some examples of the disclosure are directed to systems and methods for displaying content at an electronic device in communication with one or more displays and one or more input devices are described below. The electronic device can be configured to display content and update the display of the content in response to detecting motion of the electronic device and in accordance with a determination that the motion satisfies one or more criteria. Additionally or alternatively, the electronic device can be configured to display content and update the display of the content in response to detecting a change in location of gaze of the user and in accordance with a determination that the change in the location of the gaze satisfies one or more second criteria.

In some examples, the electronic device displays content at a first apparent depth in a computer-generated environment relative to a viewpoint of the user. The content can be displayed via the one or more displays. The first apparent depth can be selected in accordance with a measure of a depth of a fixation point of the user during a first time period. For example, the content can be displayed during a second time period subsequent to the first time period. In some examples, while displaying the content, the electronic device updates the display of the content in response to detecting motion of the electronic device in a physical environment of the electronic device. For example, updating the display of the content can include displaying the content at a second apparent depth different from the first apparent depth in the computer-generated environment relative to the viewpoint of the user. In some examples, the electronic devices update the display of the content to display the content at the second apparent depth in accordance with a determination that the motion satisfies one or more criteria.

In some examples, the electronic device tracks the eye-movement of a user of the electronic device. For example, the electronic device can track the eye-movement of the user via the one or more input devices. In some examples, the electronic device generates eye-tracking data including the indication of the measure of vergence. For example, the electronic device can generate eye-tracking data based on the eye-movement of the user. In some examples, the electronic device determines the depth of the fixation point of the user. For example, the electronic device can determine the depth of the fixation point of the user based on the measure of vergence. In some examples, the measure of vergence includes a first measure of vergence, and the eye-tracking data includes an indication of a second measure of vergence of the user. In some examples, the electronic device determines a second depth of a second fixation point different from the first depth of the first fixation point of the user. For example, the electronic device can determine the second depth of the second fixation point based on the second measure of vergence.

In some examples, while displaying the content, the electronic device updates the display of the content in response to detecting a change in location of gaze of the user from the first fixation point to the second fixation point. For example, updating the display of the content can include displaying the content at a third apparent depth different from the second apparent depth in the computer-generated environment relative to the viewpoint of the user. In some examples, the electronic devices update the display of the content to display the content at the third apparent depth in accordance with a determination that the change in the location of the gaze satisfies one or more second criteria. In some examples, the electronic devices update the display of the content to display the content at the second apparent depth in accordance with a determination that the change in the location of the gaze does not satisfy the one or more second criteria.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object). In some examples, a three-dimensional object can be displayed in the three-dimensional environment in a body-locked orientation, a tilt-locked orientation, a head-locked orientation, or a gaze-locked orientation, as described below.

As used herein, an object that is displayed in a gaze-locked orientation in a three-dimensional environment has a distance and orientation offset relative to a viewpoint of the user that corresponds to a depth of a fixation point of the user. In some examples, a gaze-locked object moves within the three-dimensional environment as the user's gaze changes; that is, a gaze-locked object moves within the user's field of view of the three-dimensional environment as the depth of a fixation point of the user changes. As used herein, an object that is displayed in a motion-locked orientation in a three-dimensional environment has a distance and orientation offset relative to a viewpoint of the user that corresponds to a depth of a fixation point of the user. In some examples, a motion-locked object moves within the three-dimensional environment as the user's motion changes; that is, a motion-locked object moves within the three-dimensional environment as one or more measures of a magnitude of the motion of the electronic device and/or user changes.

As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., can be displayed in the same cardinal direction relative to the user, regardless of head and/or body movement). Additionally or alternatively, in some examples, the body-locked object can be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes). As used herein, an object that is displayed in a world-locked orientation in a three-dimensional environment does not have a distance or orientation offset relative to the user. As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

In some examples, such as when the user is in motion, displaying the content at an apparent depth that is incompatible with the user's motion context can cause viewing discomfort and stress for the user. Accordingly, there is a need for a solution for displaying content at apparent depth(s) for viewing by the user. To improve viewing comfort for a user, under certain conditions, head-locked and/or body-locked content may be displayed at an apparent depth that matches the depth of an object (e.g., a virtual or physical object) in an XR environment. The head-mounted device may include one or more sensors that determine the depth of a physical object in a physical environment. Based at least on the depth of the object, the head-mounted device may determine an apparent depth for the virtual object and display the virtual object at the apparent depth. The apparent depth of the virtual object may be repeatedly updated to match the depths of objects in the XR environment. Accordingly, the systems and methods described herein improve the display of content by displaying the content at an apparent depth that is compatible with the user's motion and/or gaze context, thereby alleviating viewing discomfort and reducing stress for the user. For example, the content can be displayed at varying depth based on motion and/or gaze of the user in real time so as to facilitate and accommodate the dynamically changing viewing conditions of the user.

FIG. 1 illustrates an electronic device 101 presenting an extended reality (XR) environment (e.g., a computer-generated environment optionally including representations of physical and/or virtual objects) according to some examples of the disclosure. The XR environment can include, for example, three-dimensional environment 100, as shown in FIG. 1. For example, three-dimensional environment 100 can include a three-dimensional environment, a computer-generated environment, a computer graphical environment, and/or the like ("three-dimensional environment" or "computer-generated environment" or "XR environment"). In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 can be configured to detect and/or capture images of physical environment including table 106 (illustrated in the field of view of electronic device 101).

In some examples, as shown in FIG. 1, electronic device 101 includes one or more internal image sensors 114*a* oriented towards a face of the user (e.g., eye tracking cameras described below with reference to FIG. 2). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114*b* and 114*c*). Because display 120 is optionally part of a head-mounted device, the field of view of display 120 is optionally the same as or similar to the field of view of the user's eyes. In other examples, the field of view of display 120 can be smaller than the field of view of the user's eyes. In some examples, electronic device 101 can be an optical see-through device in which display 120 is a transparent or translucent display through which portions of the physical environment can be directly viewed. In some examples, display 120 can be included within a transparent lens and may overlap all or only a portion of the transparent lens. In other examples, electronic device can be a video-passthrough device in which display 120 is an opaque display configured to display images of the physical environment captured by external image sensors 114*b* and 114*c*.

In some examples, in response to a trigger, the electronic device 101 can be configured to display a virtual object 104 in the three-dimensional environment represented by a cube illustrated in FIG. 1, which is not present in the physical environment, but is displayed in the three-dimensional environment positioned on the top of real-world table 106 (or a representation thereof). Optionally, virtual object 104 can be displayed on the surface of the table 106 in the three-dimensional environment displayed via the display 120 of the electronic device 101 in response to detecting the planar surface of table 106 in the physical environment.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the three-dimensional environment. In some examples, the virtual object can represent content corresponding to the application and/or displayed via the user interface in the three-dimensional environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze can be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance can be selected using hand-tracking input detected via an input device in communication with the electronic device. In some examples, objects displayed in the three-dimensional environment can be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
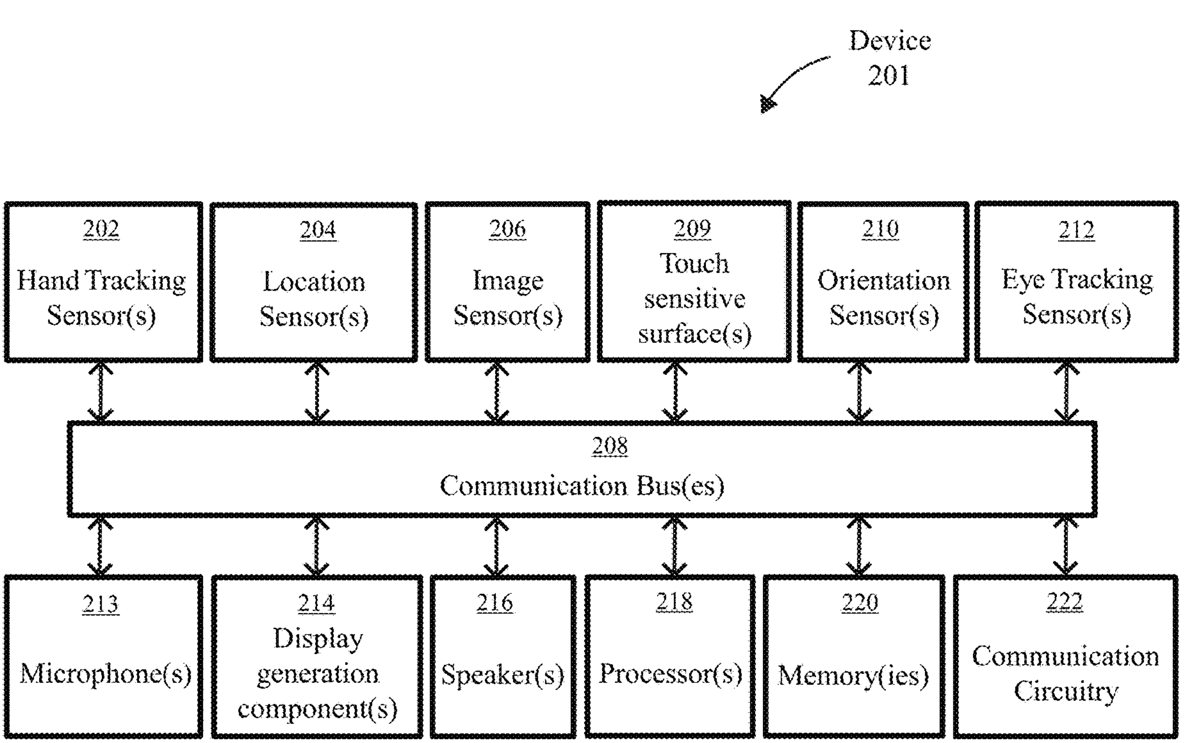
FIG. 2 illustrates a block diagram of an example architecture for a device according to some examples of the disclosure.

FIG. 2 illustrates a block diagram of an example architecture for an electronic device 201 according to some examples of the disclosure. In some examples, electronic device 201 includes one or more electronic devices. For example, the electronic device 201 can be a portable device, an auxiliary device in communication with another device, a head-mounted device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114*a* and/or external image sensors 114*b* and 114*c* in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include one or more display(s) (e.g., a liquid-crystal display (LCD), organic light-emitting diode(s) (OLED), and/or other types of display(s). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global positioning system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), In some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., leg, torso, head, or hands of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras can be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

In some examples, eye tracking sensor(s) 212 can include, for example, one or more gaze detection sensor(s). The one or more gaze detection sensors can be configured to, for example, track and/or otherwise determine a degree of vergence of a user's eyes. The vergence of the user's eyes can include, for example, convergence (e.g., user's eyes rotate inwards or towards each other to view a physical object that is close or near to the user) and/or divergence (e.g., user's eyes rotate outwards or away from each other to view an object that is far away). The degree of vergence of the user's eyes can otherwise include, for example, a measure or indication of movement, displacement, or offset of the user's eyes. The measure can be determined relative to an origin position of the user's eyes (e.g., a position of the user's eyes at an unmoved, un-displaced, or an otherwise at-rest or neutral position). In some examples, the tracked and/or otherwise determined degree of vergence of the user's eyes can be used to determine a location and/or depth of a fixation point of the user. The fixation point can include or otherwise correspond to a point or location in space (e.g., in a three-dimensional environment) at which the user is gazing or looking. In some examples, the location and/or depth of the fixation point can coincide, match, or otherwise correspond with a location (e.g., relative location, absolute location, etc.) and/or depth of an object or fixation point in space (e.g., in the three-dimensional environment). For example, a large or high measure of vergence (e.g., corresponding to a measure of a high degree of inwards rotation of the user's eyes) can be indicative of an object or fixation point that is close to the user (e.g., a short depth or depth with relatively small or low magnitude) whereas a small or low measure of vergence (e.g., corresponding to a measure of vergence and/or a low degree of inwards rotation of the user's eyes; corresponding to a measure of vergence and/or a low degree of inwards rotation of the user's eyes) can be indicative of an object that is far away from the user (e.g., a far depth or depth with relatively large or high magnitude). That is, in some examples, a large or high measure of vergence corresponds with a measure of a high degree of inwards rotation of the user's eyes and can be indicative of an object or fixation point that is close in space to the user; and a small or low measure of vergence (e.g., including negative measures of vergence, i.e., divergence of the users eyes) corresponds with a measure of a degree of outwards rotation of the user's eyes and can be indicative of an object or fixation point that is far away in space to the user.

In some examples, eye tracking sensor(s) 212 can include, for example, one or more stereo cameras (with two or more lenses and image sensors for capturing three-dimensional images). In some examples, eye tracking sensor(s) 212 can include, for example, one or more depth sensor(s). For example, the one or more depth sensor(s) can include a pixelated depth sensor (e.g., that is configured to measure multiple depths across the physical environment) or a point sensor (that is configured to measure a single depth in the physical environment). In some examples, the point sensor can be configured to align with the known display direction of head-locked content (e.g., as predetermined in or at electronic device 101, as predetermined in or at electronic device 201, etc.). For example, as described in more detail below with reference to FIGS. 4A-4B, content 442, content 444, and content 446 can include, for example, head-locked content that is displayed to appear to the user to be continuously (relatively) aligned in a generally forward-facing direction (e.g., corresponding to orientations of D3 and D4 in FIGS. 4A and 4B, respectively; corresponding to angle 436 in FIGS. 4A-4B; etc.). Accordingly, the point sensor can be configured to track or otherwise determine or measure a depth of the closest physical object aligned with the virtual object. The depth sensor (whether a pixelated depth sensor or a point sensor) may use phase detection (e.g., phase detection autofocus pixel(s)) or light detection and ranging (LIDAR). Any subset of these types of sensors may be used in combination to determine the depth of physical objects in the physical environment.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Attention is now directed towards interactions involving content (e.g., content including one or more virtual objects, and/or the like) that are displayed in a three-dimensional environment presented at an electronic device (e.g., corresponding to electronic device 101, electronic device 201, etc.) in a physical environment.

FIGS. 3A-3D illustrate examples of an electronic device in a physical environment during intermediate steps of displaying and updating content at apparent depth(s) in a three-dimensional environment relative to a viewpoint of a user of the electronic device according to some examples of the disclosure. The electronic device can include, for example, a device such as electronic device 101 and/or electronic device 201, as described with reference to FIG. 1 and/or FIG. 2. The physical environment can include a physical environment such as the physical environment described with reference to FIG. 1. For example, electronic device 101 and table 106, along with real floor 310, real walls **312*a* and 312*b*, and real window(s) 314, are located in the physical environment, as shown in FIGS. 3A-3D. Three-dimensional environment 300 represents a three-dimensional environment such as the three-dimensional environment (e.g., three-dimensional environment 100) as described with reference to FIG. 1. Three-dimensional environment 300 can include content (e.g., content 342, content 344, content 346, etc.), as described herein. Field of view 330 represents the field of view of the user in three-dimensional environment 300 at viewpoint 332. Viewpoint 332 represents the viewpoint of the user in three-dimensional environment 300, and further, represents the location or position of the user and/or electronic device 101 in three-dimensional environment 300 corresponding to the location of electronic device 101 in the physical environment in which electronic device 101** is located.

FIGS. 3A-3D illustrate top-down views and the user's views of three-dimensional environment 300. The top-down views are oriented with respect to reference frame 303 (i.e., in a direction parallel with the Z-axis of reference frame 303) and show, from above: electronic device 101 in three-dimensional environment 300, including an extent of the user's field of view 330 (shown by dashed lines), viewpoint 332, angle 334, and fixation point FP1. The user's views are oriented with respect to reference frame 305 (i.e., in a direction parallel with the Y-axis of reference frame 305) and show, from the user's perspective and field of view 330 at viewpoint 332: three-dimensional environment 300, including representations of objects in the physical environment, such as real floor(s) (e.g., real floor 310), real walls (e.g., real walls **312*a* and 312*b*), and real window(s) (e.g., real window(s) 314**).

Electronic device 101 can display and update three-dimensional environment 300, including content, for viewing (e.g., in field of view 330) by the user in superposition or in superimposed relation with the physical environment. For example, electronic device 101 can display and update three-dimensional environment 300, including a view of the representation of the real window 314 that would correspond to the user's view of the real window at the location and orientation of the electronic device 101 in the physical environment while the electronic device 101 presents the three-dimensional environment 300. Electronic device 101 can implement optical see-through or video passthrough techniques as described herein to display and update three-dimensional environment 300, including any content in three-dimensional environment 300. It should be noted that, herein, depth refers to the lateral separation between the electronic device (e.g., electronic device 101) and a location (e.g., a location of a fixation point of the user, a location of a physical object, or a location of a virtual object) in a three-dimensional environment (e.g., three-dimensional environment 300, 400, 500). In some examples, the separation between the electronic device and the location may also have a vertical component in addition to this lateral component (depth). The total distance between the electronic device and the location may be a function of the lateral separation (depth) and the vertical separation. Trigonometry may be used to characterize the relationship between total distance, lateral separation, and vertical separation, with the total distance defining the hypotenuse of a right triangle and the lateral separation and vertical separation defining the remaining two sides of the right triangle. Therefore, any one of total distance, lateral separation, and vertical separation may be calculated based on known values for the remaining two of total distance, lateral separation, and vertical separation.

Figure 3A:
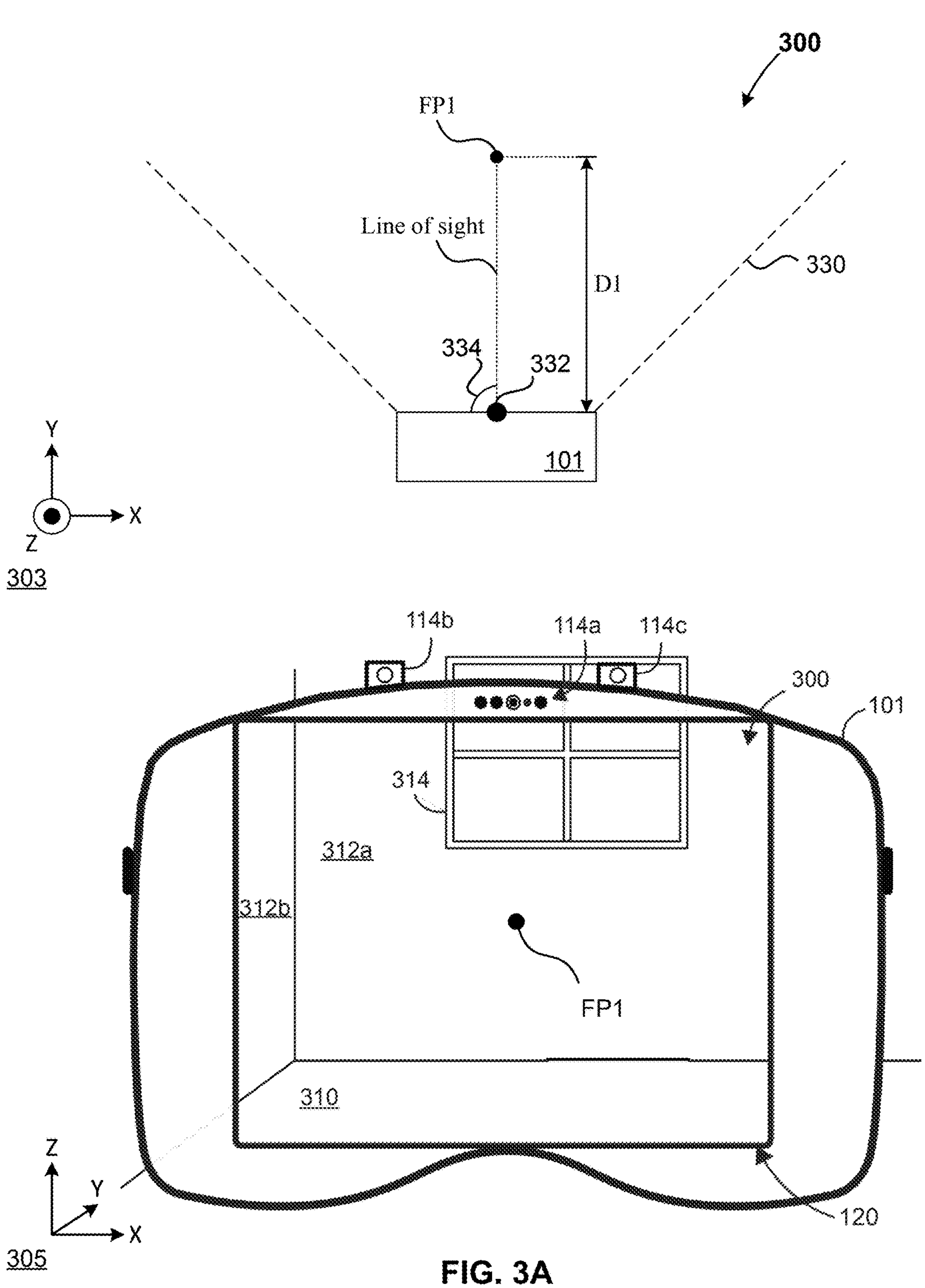
FIGS. 3A-3D illustrate examples of an electronic device in a physical environment during intermediate steps of displaying and updating content at apparent depth(s) in a three-dimensional environment relative to a viewpoint of a user of the electronic device according to some examples of the disclosure.

With reference to FIG. 3A, electronic device 101 can determine a depth of a fixation point of the user. For example, the fixation point can include an initial fixation point ("initial fixation point" or "first fixation point") of the user. In some examples, the initial fixation point can include a first fixation point (e.g., fixation point FP1) at a first depth (e.g., depth D1). In some examples, electronic device 101 can determine depth D1 of fixation point FP1 based on eye orientation and/or eye-movement of the user during an initial time period. The initial time period can include, for example, a first time period ("initial time period" or "first time period"). Fixation point FP1 corresponds to an initial point or location of a gaze ("initial fixation point" or "first fixation point") of the user in three-dimensional environment 300 during the first time period, and depth D1 corresponds to a depth ("first depth") of the initial fixation point (e.g., fixation point FP1). That is, depth D1 represents a measure or magnitude of the depth of the first fixation point relative to the position of the user (e.g., corresponding to the position of viewpoint 332) during the first time period. In some examples, a measure of the magnitude of depth D1 can be measured relative to the respective locations of fixation point FP1 and viewpoint 332, and corresponds to the distance between fixation point FP1 and viewpoint 332, as shown in FIGS. 3A-3C.

Angle 334 corresponds to the angle between the user (e.g., relative to viewpoint 332) and the fixation point (e.g., fixation point FP1). That is, angle 334 represents a relative measure or magnitude of a viewing direction or angle of the user and corresponds to the angle between a sightline, visual axis, and/or line of sight of the user at viewpoint 332 and the fixation point (e.g., fixation point FP1). The measure or magnitude of angle 334 can include a horizontal component (e.g., measured along a plane parallel to the X-Y plane), a vertical component (e.g., measured along a plane parallel to the Y-Z plane), and/or any combination thereof. For example, angle 334 can be measured relative to a surface (e.g., a front surface, etc.) of electronic device 101 and is approximately 90 degrees as shown in FIGS. 3A-3B. In this example, angle 334 includes a horizontal component and electronic device 101 determines angle 334 with respect to a plane parallel to the X-Y plane.

In some examples, electronic device 101 can determine depth D1 of fixation point FP1 based on eye-movement of the user during the initial time period (e.g., the first time period). For example, electronic device 101 can track, via one or more input devices (e.g., eye-tracking sensor(s) 212), eye orientation and/or eye-movement of the user during the first time period. In some examples, electronic device 101 can generate, based on the eye orientation and/or eye-movement of the user during the first time period, eye-tracking data including an indication of a measure of vergence ("measure of vergence" or "initial measure of vergence" or "first measure of vergence"). Accordingly, electronic device 101 can determine, based on the measure of vergence, the initial depth (e.g., depth D1) of the initial fixation point (e.g., fixation point FP1) of the user, as shown in FIG. 3A.

Figure 3B:
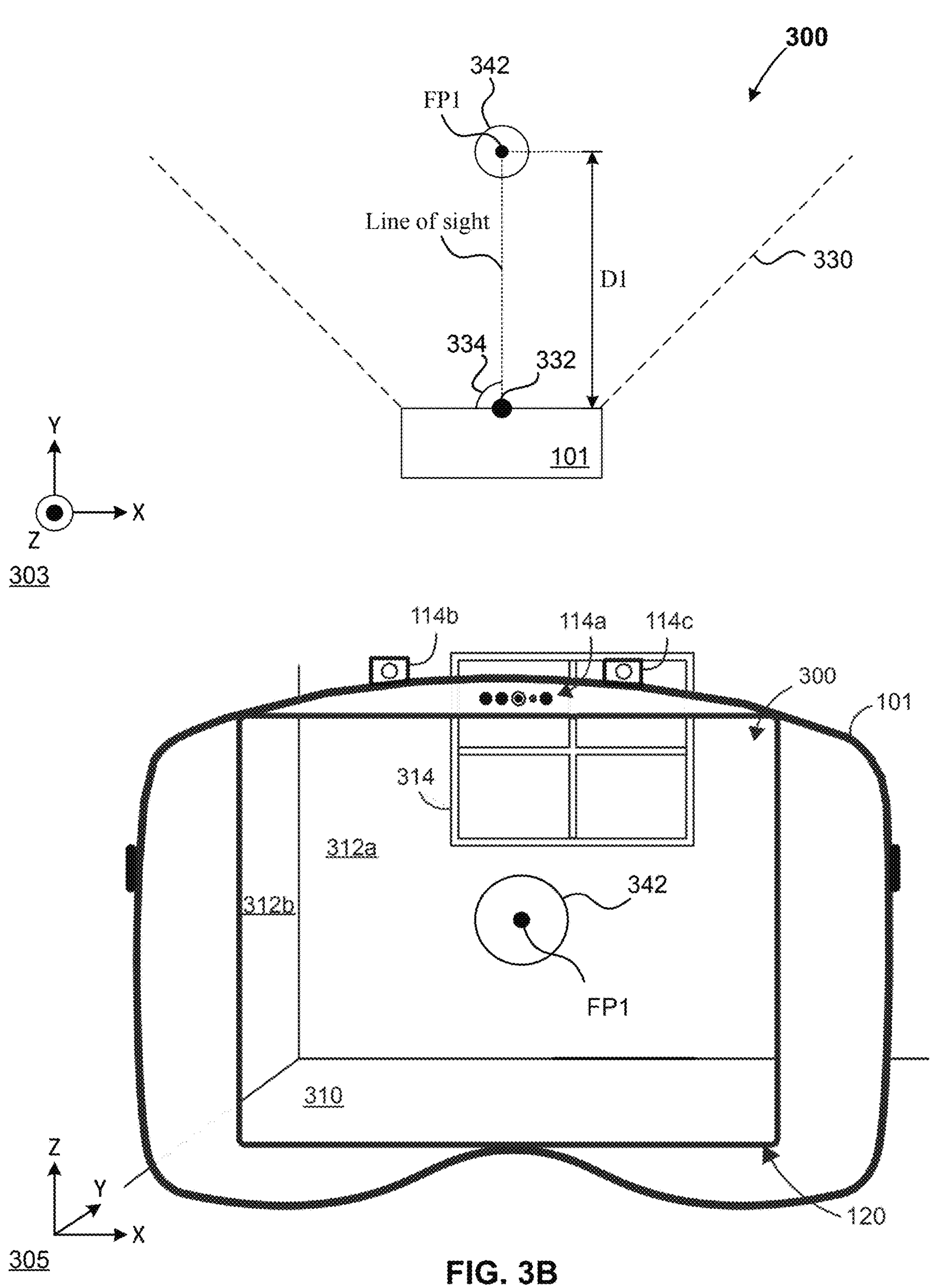
Figure 3C:
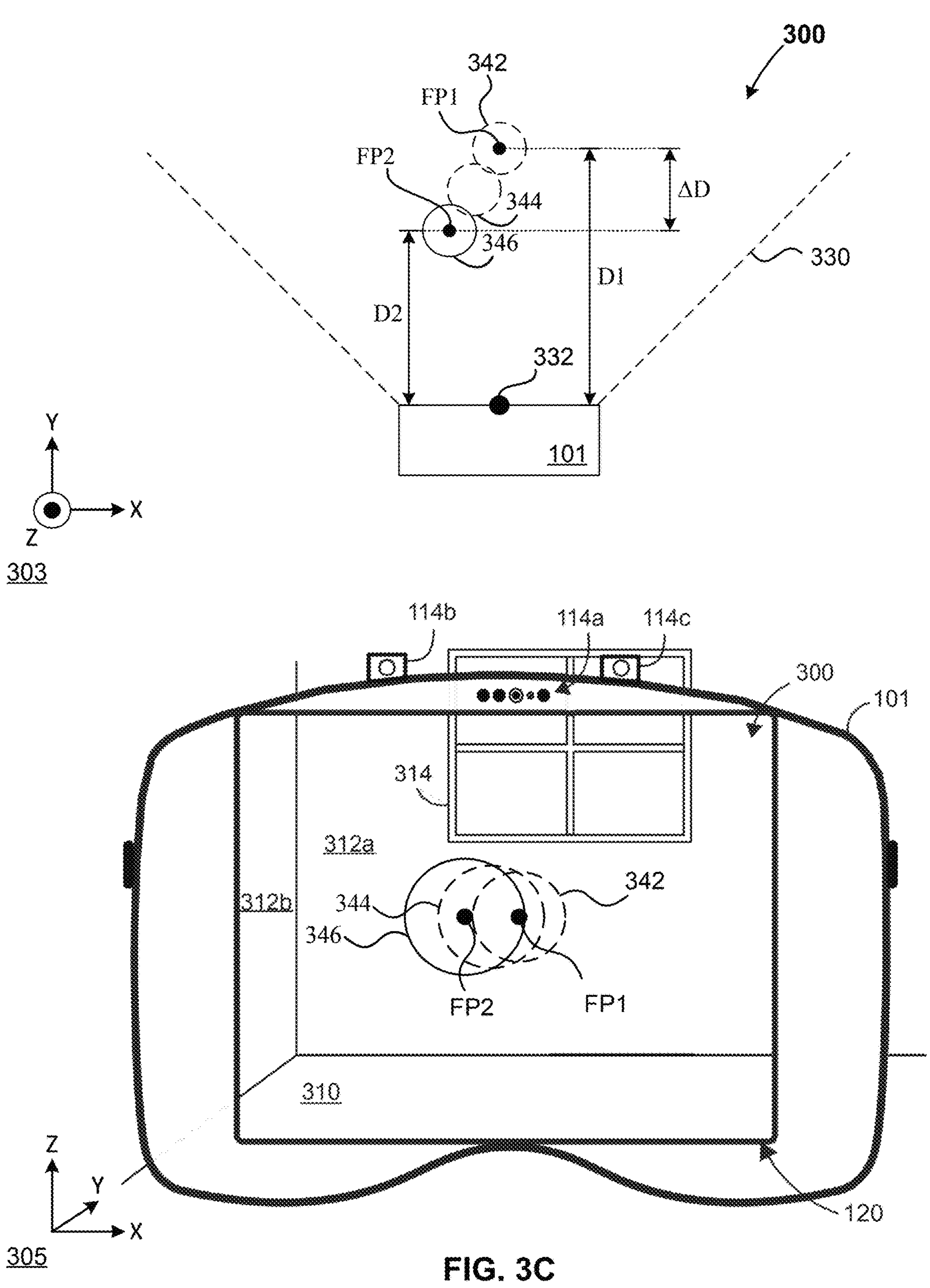

With reference to FIG. 3B, electronic device 101 can display, via one or more displays, content at a first apparent depth in a computer-generated environment (e.g., three-dimensional environment 300) relative to a viewpoint (e.g., viewpoint 332) of the user. The one or more displays can include, for example, display(s) such as display generation component(s) 214, as described with reference to FIG. 2. The content can include content 342, as shown in FIG. 3B. For example, content 342 can include two-dimensional and/or three-dimensional computer-generated imagery such as virtual content, virtual object(s), extended reality content, extended reality object(s), user interface element(s), content item(s), and/or the like ("content" or "object(s)"). In some examples, the first apparent depth can include an initial apparent depth ("first apparent depth" or "initial apparent depth"). For example, electronic device 101 can display content 342 at the first apparent depth in three-dimensional environment 300 relative to viewpoint 332, as shown in FIG. 3B. In some examples, the first apparent depth can be selected in accordance with a measure of the depth (e.g., depth D1) of the fixation point (e.g., fixation point FP1) of the user during the first time period. For example, a magnitude of the first apparent depth can be selected to correspond to a measure of depth D1 of fixation point FP1, as shown in FIG. 3B.

In some examples, electronic device 101 can display content 342 at the first apparent depth such that content 342 at least partially coincides with or corresponds to depth D1 and/or a location of fixation point FP1, as shown in FIG. 3B. In some examples, electronic device 101 can display content 342 at the first apparent depth during a time period subsequent to the first time period. For example, the time period subsequent to the first time period can include a subsequent time period ("subsequent time period," "time period subsequent to the first time period," etc.). In some examples, the subsequent time period can include, for example, a second time period, a third time period, and/or the like. For example, electronic device 101 can display content 342 at the first apparent depth during a second time period subsequent to the first time period. In some examples, electronic device 101 can display content 342 at the first apparent depth during the second time period in accordance with a measure of depth D1 of fixation point FP1 of the user during the first time period.

With reference to FIG. 3C, electronic device 101 can display, via the one or more displays, the content at a second apparent depth different from the first apparent depth in the computer-generated environment (e.g., three-dimensional environment 300) relative to the viewpoint (e.g., viewpoint 332) of the user. The content can include content 344, content 346, as shown in FIG. 3C. For example, content 344 and/or content 346 can include content corresponding to content 342, as described herein. In some examples, electronic device 101 can, while displaying content 342 (e.g., at the first apparent depth) and in response to detecting a change in location of gaze of the user, as discussed below, update the displayed content, including displaying the content at the second apparent depth, as shown in FIG. 3C. In some examples, the second apparent depth can include, for example, a subsequent apparent depth ("second apparent depth" or "third apparent depth" or "subsequent apparent depth"). For example, content 346 can be displayed at the second apparent depth such that content 346 at least partially coincides with or corresponds to depth D2 and/or a location of fixation point FP2, as shown in FIG. 3C.

In some examples, while displaying content 342 (e.g., during the subsequent time period), electronic device 101 can detect a change in location of gaze of the user. For example, the change in the location of the gaze of the user can include a change in the location of a fixation point (e.g., the initial fixation point) of the user. In some examples, the change in the location of the gaze can include a change in depths (e.g., depth D1, depth D2, etc.) of fixation points (e.g., fixation point FP1, fixation point FP2, etc.) of the user, as shown in FIG. 3C. For example, while displaying content 342, electronic device 101 can determine a depth of a subsequent fixation point of the user. In some examples, the subsequent fixation point can include, for example, a second fixation point ("subsequent fixation point" or "second fixation point") of the user. For example, the subsequent fixation point can include a second fixation point (e.g., fixation point FP2) at a second depth (e.g., depth D2), as shown in FIG. 3C.

Figure 3D:
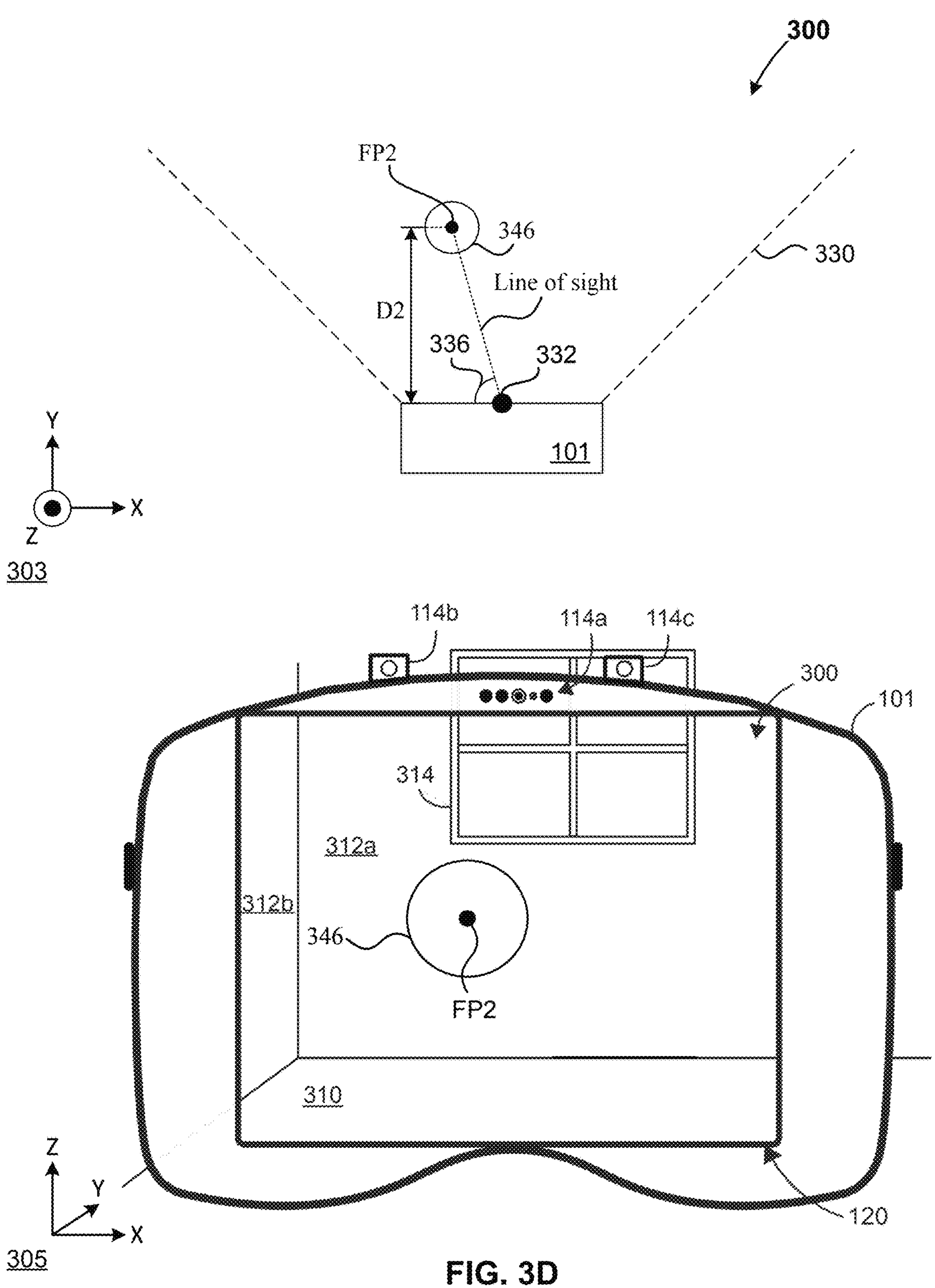

Fixation point FP2 corresponds to a subsequent point or location of a gaze ("subsequent fixation point" or "second fixation point") of the user in three-dimensional environment 300 during the subsequent time period (e.g., the second time period), and depth D2 corresponds to a depth of the subsequent fixation point (e.g., fixation point FP2). For example, depth D2 represents a measure or magnitude of the depth (e.g., depth D2) of the subsequent fixation point (e.g., fixation point FP2) during the subsequent time period (e.g., the second time period, etc.) relative to the depth (e.g., depth D1) of the initial fixation point (e.g., fixation point FP1) during the initial time period (e.g., the first time period, etc.), as shown in FIG. 3C. In some examples, a measure of the magnitude of depth D2 can be measured relative to the respective locations of fixation point FP2 and viewpoint 332, and corresponds to the distance between fixation point FP2 and viewpoint 332, as shown in FIGS. 3C-3D.

Angle 336 corresponds to the angle between the user (e.g., relative to viewpoint 332) and the fixation point (e.g., fixation point FP2). That is, angle 336 represents a relative measure or magnitude of a viewing direction or angle of the user and corresponds to the angle between a sightline, visual axis, and/or line of sight of the user at viewpoint 332 and the fixation point (e.g., fixation point FP2), such as described with reference to angle 334 and the fixation point (e.g., fixation point FP1) shown in FIG. 3A. For example, angle 336 can be measured relative to a line of sight of the user and a surface (e.g., a front surface, etc.) of electronic device 101 and is approximately less than 90 degrees, as shown in FIG. 3D. In this example, angle 336 includes a horizontal component and electronic device 101 determines angle 336 with respect to a plane parallel to the X-Y plane. In some examples, angle 336 can change relative to angle 334, such as shown in FIGS. 3B and 3D.

In some examples, electronic device 101 can determine depth D2 of fixation point FP2 based on eye orientation and/or eye-movement of the user during the subsequent time period. For example, the subsequent time period can include a second time period ("second time period") subsequent to the first time period, a third time period ("third time period") subsequent to the first time period and/or the second time period, and/or the like. In some examples, electronic device 101 can display the content at the second apparent depth during a time period subsequent to the second time period. For example, the time period subsequent to the second time period can include a third time period subsequent to the second time period, a fourth time period subsequent to the second time period and/or the third time period, and/or the like.

In some examples, electronic device 101 can determine depth D2 of fixation point FP2 based on eye orientation and/or eye-movement of the user during the subsequent time period. For example, electronic device 101 can track, via the one or more input devices (e.g., eye-tracking sensor(s) 212), eye orientation and/or eye-movement of the user during the subsequent time period. In some examples, electronic device 101 can generate, based on the eye orientation and/or eye-movement of the user during the subsequent time period, eye-tracking data including an indication of a second measure of vergence ("second measure of vergence" or "subsequent measure of vergence"). Accordingly, electronic device 101 can determine, based on the second measure of vergence, the second depth (e.g., depth D2) of the second fixation point (e.g., fixation point FP2) of the user, as shown in FIG. 3C.

For example, an initial location of the gaze of the user can include a position corresponding to the position of fixation point FP1, as shown in FIGS. 3A-3C. A subsequent or changed location of the gaze of the user can include a position corresponding to the position of fixation point FP2, as shown in FIGS. 3C-3D. The change in gaze of the user can include a change in gaze from fixation point FP1 to fixation point FP2. Fixation point FP2 corresponds to a location of a gaze of the user during the subsequent time period. Depth D2 corresponds to a measure of the depth of fixation point FP2 relative to the position of viewpoint 332 in three-dimensional environment 300 during the subsequent time period. Angle 336 represents an angle between the user (e.g., relative to viewpoint 332) and the fixation point (e.g., fixation point FP2).

In some examples, electronic device 101 can detect the change in the location of the gaze of the user based on measure(s) of depth D1 and depth D2, such as shown in FIG. 3C. For example, electronic device 101 can detect the change in the location of the gaze of the user when a difference between depth D1 and depth D2 exceeds a predetermined threshold during the subsequent time period. In some examples, the predetermined threshold can include a first predetermined threshold, a second predetermined threshold, and/or the like. For example, electronic device 101 can compare a magnitude of the difference between depth D1 and depth D2 with a value of the first predetermined threshold to detect the change in the location of the gaze of the user when, or otherwise, in response to, determining the magnitude of the difference exceeds the value of the first predetermined threshold. In some examples, the value of the first predetermined threshold can be selected to correspond to a predetermined magnitude of the difference between (i) depth D1 and depth D2, (ii) fixation point FP1 and fixation point FP2, (iii) fixation point FP1 or fixation point FP2 and viewpoint 332, and/or the like. The value of the predetermined threshold, including, for example, the first predetermined threshold, the second predetermined threshold, and/or the like, can otherwise be selected as a matter of design.

In some examples, while displaying content 342 and in response to detecting the change in location of gaze of the user, electronic device 101 can update the displayed content. For example, updating the displayed content can include determining that the change in the location of the gaze of the user satisfies one or more criteria. In some examples, the change in the location of the gaze of the user can include, for example, a change in the location of the gaze of the user from fixation point FP1 to fixation point FP2, such as shown in FIG. 3C. For example, the one or more criteria can include a first criterion, a second criterion, and/or the like.

In some examples, the one or more criteria can include a criterion (e.g., a first criterion, a second criterion, etc.) that is satisfied when a difference between depth D1 and depth D2 exceeds the first predetermined threshold. For example, the criterion can be defined to correspond to the first predetermined threshold in which the value is selected to correspond to a predetermined magnitude of the difference between depth D1 and depth D2 such that the criterion is satisfied when the difference between depth D1 and depth D2 exceeds the predetermined magnitude (and the change in the location of the gaze of the user is thereby detected), causing electronic device 101 to display the content (e.g., content 344 and/or content 346) at the subsequent apparent depth (e.g., depth D2).

In some examples, the one or more criteria can include a criterion (e.g., a first criterion, a second criterion, etc.) that is satisfied when a difference between fixation point FP1 and fixation point FP2 exceeds the first predetermined threshold. For example, the criterion can be defined to correspond to the first predetermined threshold, in which the value of the first predetermined threshold is selected to correspond to a predetermined magnitude of the difference between fixation point FP1 and fixation point FP2 such that the criterion is satisfied when the difference between fixation point FP1 and fixation point FP2 exceeds the predetermined magnitude (and the change in the location of the gaze of the user is thereby detected), causing electronic device 101 to display the content (e.g., content 344 and/or content 346) at the subsequent apparent depth.

In some examples, the one or more criteria can include a criterion (e.g., a first criterion, a second criterion, etc.) that is satisfied when a difference between fixation point FP1 or fixation point FP2 and viewpoint 332 exceeds the first predetermined threshold. For example, the criterion can be defined to correspond to the first predetermined threshold in which the value of the first predetermined threshold is selected to correspond to a predetermined magnitude of the difference between fixation point FP1 or fixation point FP2 and viewpoint 332 such that the criterion is satisfied when the difference between fixation point FP1 or fixation point FP2 and viewpoint 332 exceeds the predetermined magnitude (and the change in the location of the gaze of the user is thereby detected), causing electronic device 101 to display the content (e.g., content 344 and/or content 346) at the subsequent apparent depth.

In some examples, the one or more criteria can include a criterion that is defined to enable and provide for a delay in displaying the content at the subsequent apparent depth. In some examples, the delay can include an optional delay corresponding to a delay period, a sensitivity level for detecting the change in gaze of the user, and/or the like. For example, the one or more criteria can include a criterion (e.g., a first criterion, a second criterion, etc.) that is satisfied when a difference between depth D1 and depth D2 exceeds a predetermined threshold such as a second predetermined threshold. For example, the criterion can be defined to correspond to the second predetermined threshold in which the value of the second predetermined threshold is selected to be greater than the value of the first predetermined threshold such that the criterion is satisfied after the change in the location of the gaze of the user is detected (e.g., after determining the magnitude of the difference exceeds the value of the first predetermined threshold), causing electronic device 101 to display the content (e.g., content 344 and/or content 346) with a delay. Accordingly, the value of the second threshold difference can be selected to simulate a delay or sensitivity level for updating and/or moving the displayed content, as described in further detail below. The optional delay in displaying the content at the subsequent apparent depth can otherwise be defined, if desired, as a matter of design.

In some examples, the value of the second predetermined threshold can be selected to be greater than the value of the first predetermined threshold such that the criterion is satisfied after the change in the location of the gaze of the user is detected, causing electronic device 101 to display content 346 at the subsequent apparent depth with the delay. For example, the value of the second predetermined threshold can be selected to be greater than the value of the first predetermined threshold such that the criterion is satisfied after the change in the location of the gaze of the user is detected, causing electronic device 101 to display content 344 at an intermediate apparent depth with the delay. For example, the intermediate apparent depth can include a depth at least partially between the initial apparent depth (e.g., corresponding with depth D1) and the subsequent apparent depth (e.g., corresponding with depth D2), as shown in FIG. 3C. In some examples, the value of the second predetermined threshold can be selected to be substantially equal to the value of the first predetermined threshold such that the criterion is satisfied when, or otherwise, in response to detecting or determining, the change in the location of the gaze of the user, causing electronic device 101 to display content 346 at the subsequent apparent depth without the delay.

In some examples, the one or more criteria can include a criterion (e.g., a first criterion, a second criterion, etc.) that is satisfied when a difference between fixation point FP1 or fixation point FP2 and viewpoint 332 exceeds the first predetermined threshold for a predetermined duration. Additionally or alternatively, in some examples, the one or more criteria can include a criterion (e.g., a first criterion, a second criterion, etc.) that is satisfied when a difference between depth D1 and depth D2 exceeds the first predetermined threshold for the predetermined duration. For example, the criterion can be defined to correspond to the first predetermined threshold in which the value is selected to correspond to a predetermined magnitude of the difference between depth D1 and depth D2 such that the criterion is satisfied when the difference between depth D1 and depth D2 exceeds the predetermined magnitude (and the change in the location of the gaze of the user is thereby detected) for an amount of time substantially equal to or greater than the predetermined duration, causing electronic device 101 to display the content (e.g., content 344 and/or content 346) at the subsequent apparent depth (e.g., depth D2).

In some examples, while displaying content 342 and in response to detecting the change in location of gaze of the user, electronic device 101 can update the displayed content in the computer-generated environment. For example, updating the displayed content can include moving the content (e.g., content 342) relative to the viewpoint (e.g., viewpoint 332) of the user in the computer-generated environment (e.g., three-dimensional environment 300). In some examples, moving the content can include, for example, moving the content from first apparent depth to the second apparent depth after the second time period, such as shown in FIG. 3C. For example, electronic device 101 can display, via the one or more displays, content 346 at the second apparent depth during the third time period.

Alternatively or in addition, in some examples, moving the content from first apparent depth and to the second apparent depth can include, for example, moving the content from the first apparent depth to an intermediate depth, and afterward, moving the content from the intermediate depth to the second apparent depth. For example, electronic device 101 can display, via the one or more displays, content 344 at the intermediate depth prior to displaying content 346 at the second apparent depth during the third time period. For example, the intermediate depth can include an apparent depth between the first apparent depth (e.g., corresponding to the location of fixation point FP1) and the second apparent depth (e.g., corresponding to the location of fixation point FP2), as shown in FIG. 3C. In some examples, electronic device 101 can display, via the one or more displays, content 344 at the intermediate depth during an intervening time period. For example, the intervening time period can include an interval between the second time period and the third time period. As another example, the intervening time period can include an interval between the first time period and the third time period. As another example, the intervening time period can include an interval prior to the third time period.

With reference to FIG. 3D, electronic device 101 can display, via the one or more displays, the content at the second apparent depth in the computer-generated environment (e.g., three-dimensional environment 300) relative to the viewpoint (e.g., viewpoint 332) of the user. The content can include content 346, as shown in FIG. 3D. For example, electronic device 101 can display content 346 at the second apparent depth (e.g., depth D2) in three-dimensional environment 300, as shown in FIG. 3D. In some examples, the second apparent depth can be selected in accordance with a measure of the second depth (e.g., depth D2) of the second fixation point (e.g., fixation point FP2) of the user during the second time period. For example, a magnitude of the second apparent depth can be selected to correspond to a measure of depth D2 of fixation point FP2, as shown in FIG. 3D.

In some examples, content 346 can be displayed at the second apparent depth such that content 346 at least partially coincides with or corresponds to depth D2 and/or a location of fixation point FP2, as shown in FIGS. 3C-3D. In some examples, electronic device 101 can display content 346 at the second apparent depth during a time period subsequent to the second time period. For example, the time period subsequent to the second time period can include a third time period. In some examples, the third time period can include, for example, a subsequent time period, and/or the like. In some examples, content 346 can be displayed at the second apparent depth during a third time period subsequent to the second time period. For example, electronic device 101 can display content 346 at the second apparent depth during the third time period in accordance with a measure of depth D2 of fixation point FP2 of the user during the second time period. For example, electronic device 101 can display content 344 during a transition period following the subsequent time period such as at a depth greater than depth D2 and less than depth D1.

FIGS. 3A-3D show examples of gaze-locked content. In some examples, content 342 can be displayed in a gaze-locked orientation, as described herein. For example, in FIGS. 3A-3D, fixation point FP1 is located at depth D1 and angle 334 relative to electronic device 101 (e.g., a front surface of device 101). Specifically, depth D1 and angle 334 may be measured relative to viewpoint 332 on electronic device 101. Similarly, depth D2 and angle 336 may be measured relative to viewpoint 332 on electronic device 101. For example, viewpoint 332 can be located so as to be aligned with the center of electronic device 101 or any other desired portion of the electronic device 101. In FIGS. 3A-3C, angle 334 corresponds to approximately 90 degrees such that fixation point FP1 and content 342 is set directly in front of electronic device 101. Accordingly, as shown in the top-down view and user-perspective view of FIG. 3A, fixation point FP1 and content 342 appear in the center of field of view 330. Similarly, as shown in the top-down views and user-perspective views of FIGS. 3B-3D, fixation point FP2 and content 344 and/or content 346 appear in the center of field of view 330 (at a depth less than that of content 344 as shown in FIGS. 3B-3C).

Moving content (e.g., content 342, 442, 542, etc.) in the three-dimensional environment (e.g., three-dimensional environment 300, three-dimensional environment 400, three-dimensional environment 500, etc.) with a delay can improve the user experience by dampening movement of content (e.g., content 342, 442, 542, etc.) in response to slight shifts in the location of the electronic device 101 as well as preventing the sensation that content (e.g., content 342, 442, 542, etc.) is rigidly attached to the electronic device, which could be distracting or uncomfortable to the user. Moreover, in some situations, moving content (e.g., content 342, 442, 542, etc.) with the delay can enable the electronic device 101 to smooth the motion of content (e.g., content 342, 442, 542, etc.) while still moving content (e.g., content 342, 442, 542, etc.) in accordance with the speed and/or direction of movement of the electronic device 101 and maintain display of content (e.g., content 342, 442, 542, etc.) within the field of view of the display in the three-dimensional environment 300. In some examples, the amount of dampening of the motion of content (e.g., content 342, 442, 542, etc.) can depend on one or more parameters of the interpolation applied by the electronic device 101 to the location of content (e.g., content 342, 442, 542, etc.) over time in accordance with movement by the electronic device 101. Example parameters of the interpolation include relative weighting between locations 304 and 306 and/or a period of time delay with which electronic device 101 can apply the interpolation.

When people walk or run, their heads can move in directions and/or dimensions in space other than the direction of travel. Thus, in examples in which electronic device 101 is a head-mounted display or includes a head-mounted display, the electronic device 101 may also move in directions and/or dimensions other than the direction of travel during use. For example, when walking, the user's head may move up and down in accordance with the user's steps in addition to moving in the direction of travel. As another example, when running, the user's head may move up and down and/or side to side in accordance with the user's steps in addition to moving in the direction of travel. While a person is walking or running, the human brain may ignore the motion of the user's environment relative to the user's head in directions other than the direction of travel, such as up and down and/or left to right in accordance with the user's steps. However, in some situations, the human brain is not as readily able to ignore this motion for virtual objects displayed by an electronic device simulating those elements following the user.

For example, content (e.g., content 342, 442, 542, etc.) displayed with no delay in motion up and down and/or left to right can appear to the user as moving around and/or bouncing, which can be distracting or uncomfortable to the user or make it difficult for the user to focus on the virtual object. As another example, content (e.g., content 342, 442, 542, etc.) displayed with the same motion up and down and/or side to side as the movement of the user's head while running or walking could appear to be bouncing, moving around, and/or floating in a manner that is distracting or uncomfortable to the user. Thus, in some examples, electronic device 101 can apply a correction factor to the movement of the content to adjust the delay and/or dampening in motion of the virtual object in accordance with the user's steps (e.g., up and down and/or side to side), as described below with reference to FIGS. 4A-5B.

Figure 4A:
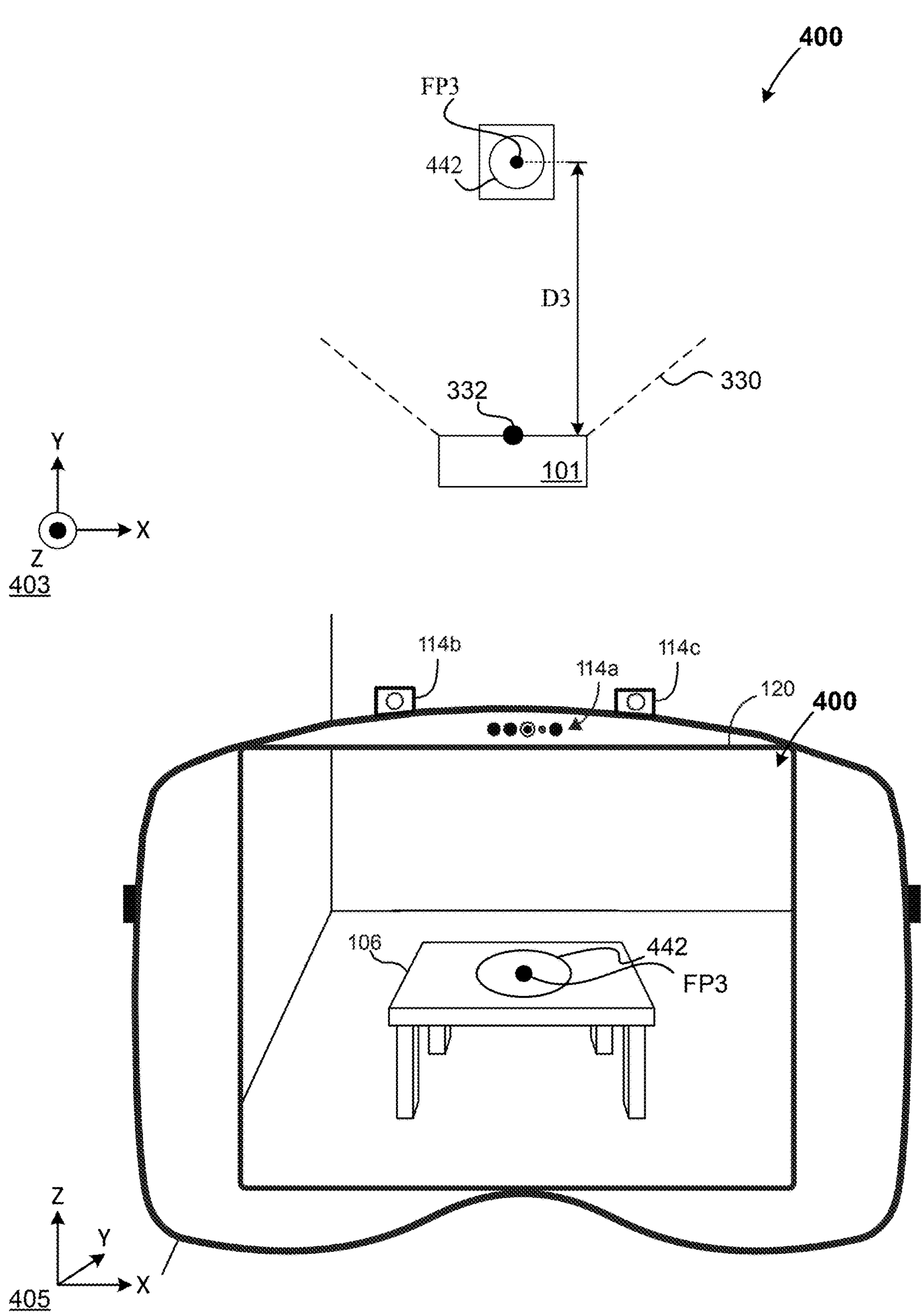
FIGS. 4A-4B illustrate examples of an electronic device in a physical environment during intermediate steps of displaying and updating content at apparent depth(s) in a three-dimensional environment relative to a viewpoint and motion of a user of the electronic device according to some examples of the disclosure.
Figure 4B:
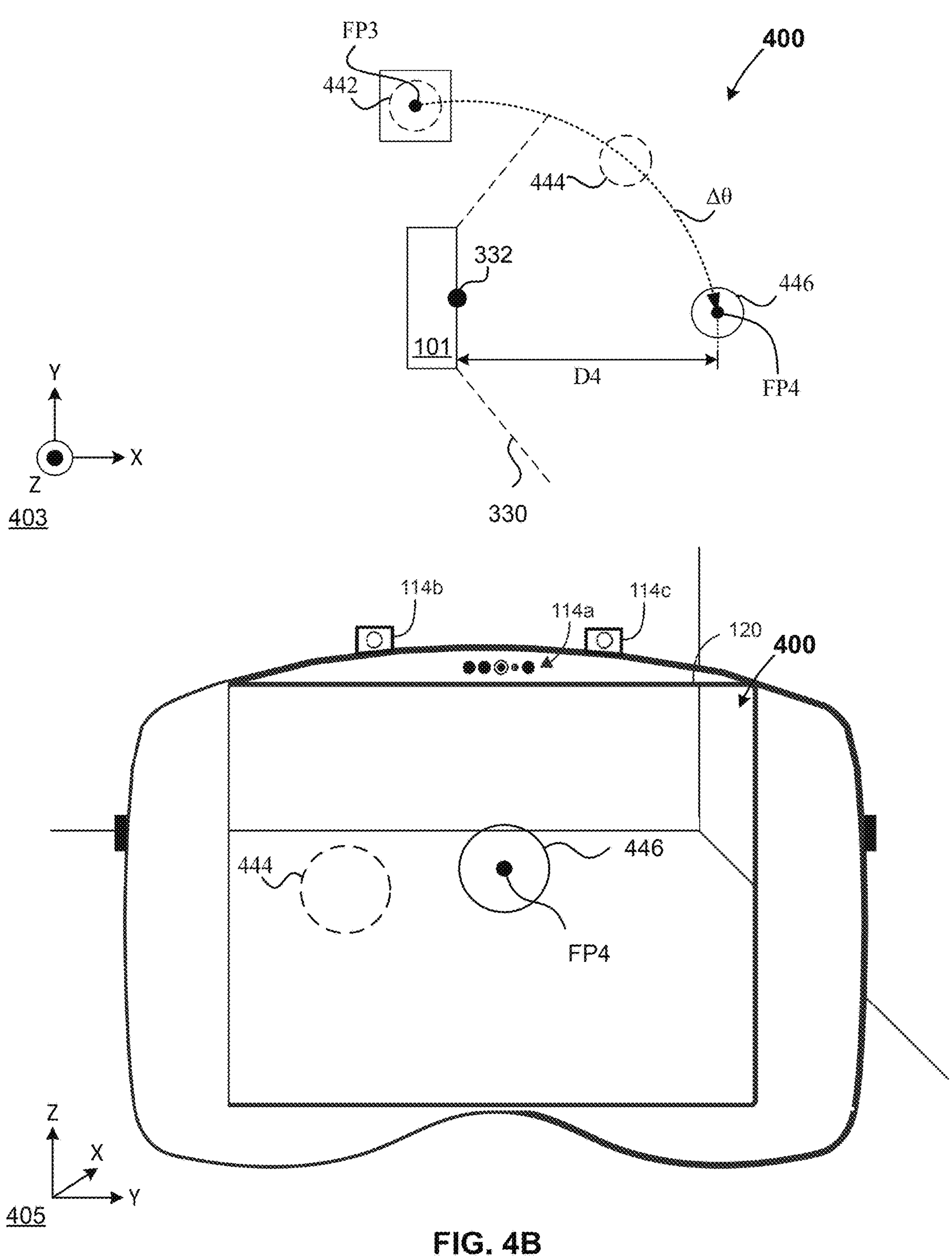

FIGS. 4A-4B illustrate examples of an electronic device in a physical environment during intermediate steps of displaying and updating content at apparent depth(s) in a three-dimensional environment relative to a viewpoint and motion of a user of the electronic device according to some examples of the disclosure. The electronic device can include, for example, a device such as electronic device 101 and/or electronic device 201, as described with reference to FIG. 1 and/or FIG. 2. The physical environment can include a physical environment such as the physical environment described with reference to FIG. 1. For example, electronic device 101 and table 106 are located in the physical environment, as shown in FIGS. 4A-4B. Three-dimensional environment 400 represents a three-dimensional environment such as the three-dimensional environment (e.g., three-dimensional environment 100 or three-dimensional environment 300) described with reference to FIG. 1 and/or FIGS. 3A-3D. Three-dimensional environment 400 can include content (e.g., content 442, content 444, content 446, etc.), as described herein. In some examples, content 442, content 444, and/or content 446 can include, for example, gaze-locked content, as described herein.

FIGS. 4A-4B illustrate top-down views and the user's views of three-dimensional environment 400 and correspond in terms of orientation with the top-down views and the user's views of three-dimensional environment 300, as described with reference to FIGS. 3A-3D. The top-down views are oriented with respect to reference frame 403 and show, from above: electronic device 101 in three-dimensional environment 400, including field of view 330, viewpoint 332, angle 334, and fixation point FP1. The user's views are oriented with respect to reference frame 405 and show, from the user's perspective and field of view 330 at viewpoint 332: three-dimensional environment 400, including representations of objects in the physical environment, such as table 106. FIGS. 4A-4B illustrate examples of motion of the user of the electronic device, including motion corresponding at least partially to angular displacement about Z-axis of reference frames 403 and 405. For example, the motion can include the user turning their head, turning to the right, and/or the like.

With reference to FIG. 4A, electronic device 101 can determine a depth of a fixation point of the user, such as described with reference to FIG. 3A. For example, the fixation point can include an initial fixation point (e.g., fixation point FP3) of the user. In some examples, the initial fixation point can include an initial fixation point (e.g., fixation point FP3) at a first depth (e.g., depth D3). In some examples, electronic device 101 can determine depth D3 of fixation point FP3 based on eye orientation and/or eye-movement of the user during an initial time period. The initial time period can include, for example, a first time period, a second time period, and/or the like, as described herein. Fixation point FP3 corresponds to an initial fixation point of the user in three-dimensional environment 400 during the first time period, and depth D3 corresponds to a depth (e.g., a first depth, etc.) of the initial fixation point (e.g., fixation point FP3).

In some examples, electronic device 101 can determine depth D3 of fixation point FP3 based on eye orientation and/or eye-movement of the user during the initial time period (e.g., the first time period), such as described with reference to FIGS. 3A-3D. For example, electronic device 101 can track, via one or more input devices (e.g., eye-tracking sensor(s) 212), eye orientation and/or eye-movement of the user during the first time period. In some examples, electronic device 101 can generate, based on the eye orientation and/or eye-movement of the user during the first time period, eye-tracking data including an indication of an initial measure of vergence. Accordingly, electronic device 101 can determine, based on the initial measure of vergence, the initial depth (e.g., depth D3) of the initial fixation point (e.g., fixation point FP3) of the user, as shown in FIG. 4A.

With continued reference to FIG. 4A, electronic device 101 can display, via the one or more displays, content at a first apparent depth in a computer-generated environment (e.g., three-dimensional environment 400) relative to a viewpoint (e.g., viewpoint 332) of the user, such as described with reference to FIG. 3B. The content can include content 442, content 444, and/or content 446, as shown in FIGS. 4A-4B. In some examples, the first apparent depth can include an initial apparent depth, as described herein. For example, electronic device 101 can display content 442 at the first apparent depth in three-dimensional environment 400 relative to viewpoint 332, as shown in FIG. 4A. In some examples, the first apparent depth can be selected in accordance with a measure of the depth (e.g., depth D3) of the fixation point (e.g., fixation point FP3) of the user during the first time period. For example, a magnitude of the first apparent depth can be selected to correspond with a measure of depth D3 of fixation point FP3, as shown in FIGS. 4A-4B.

In some examples, electronic device 101 can display content 442 at the first apparent depth such that content 442 at least partially coincides or corresponds with depth D3 and/or a location of fixation point FP3, as shown in FIGS. 4A-4B. In some examples, electronic device 101 can display content 442 at the first apparent depth during a time period subsequent to the first time period, as described herein. For example, the time period subsequent to the first time period can include a subsequent time period. In some examples, the subsequent time period can include, for example, a second time period, a third time period, and/or the like. For example, electronic device 101 can display content 442 at the first apparent depth during a second time period subsequent to the first time period. In some examples, electronic device 101 can display content 442 at the first apparent depth during the second time period in accordance with a measure of depth D3 of fixation point FP3 of the user during the first time period.

With reference to FIG. 4B, electronic device 101 can display, via the one or more displays, the content at a second apparent depth different from the first apparent depth in the computer-generated environment (e.g., three-dimensional environment 300) relative to the viewpoint (e.g., viewpoint 332) of the user. The content can include content 444 and/or content 446, as shown in FIG. 4B. In some examples, content 444 and/or content 446 can include content such as content 344 and/or content 346, such as described with reference to FIGS. 3A-3D. For example, content 444 and/or content 446 can include content corresponding to content 442, as described herein. In some examples, electronic device 101 can, while displaying content 442 (e.g., at the first apparent depth) and in response to detecting a change in location of gaze of the user, such as discussed above with reference to FIG. 3C, update the displayed content, including displaying the content at the second apparent depth, as shown in FIG. 4B. For example, the second apparent depth can include a subsequent apparent depth such as a second apparent depth, a third apparent depth, and/or the like, as described herein.

In some examples, electronic device 101 can display content 446 at the second apparent depth such that content 446 at least partially coincides with or corresponds to depth D4 and/or a location of fixation point FP4, as shown in FIG. 4B. Fixation point FP4 corresponds to a subsequent fixation point of the user in three-dimensional environment 400 during the subsequent time period (e.g., the second time period, etc.), and depth D4 corresponds to a depth of the subsequent fixation point (e.g., fixation point FP4), such as described with reference to fixation point FP2 and depth D2 of FIG. 3C. For example, depth D4 represents a measure or magnitude of the depth (e.g., depth D4) of the subsequent fixation point (e.g., fixation point FP4) during the subsequent time period (e.g., the second time period, etc.) relative to the depth (e.g., D3) of the initial fixation point (e.g., fixation point FP3) during the initial time period (e.g., the first time period, etc.), as shown in FIG. 4B.

In some examples, electronic device 101 can determine depth D4 of fixation point FP4 based on eye orientation and/or eye-movement of the user during the subsequent time period, such as described with reference to fixation point FP2 and depth D2 of FIG. 3C. For example, electronic device 101 can determine, based on the second measure of vergence, the second depth (e.g., depth D4) of the second fixation point (e.g., fixation point FP4) of the user, as shown in FIG. 4B. Accordingly, electronic device 101 can display the content at the second apparent depth during a time period subsequent to the second time period, including, for example, a third time period subsequent to the second time period, a fourth time period subsequent to the second time period and/or the third time period, and/or the like.

In some examples, while displaying content 442 (e.g., during the subsequent time period), electronic device 101 can detect motion of electronic device 101 in the physical environment. In some examples, in response to detecting motion (e.g., of electronic device 101) in the physical environment, electronic device 101 can update the displayed content, including displaying the content at the second apparent depth, as shown in FIG. 4B. For example, electronic device 101 can detect the motion based on one or more measures of motion of electronic device 101. In some examples, the one or more measures of motion can include, for example, one or more measures of angular displacement (e.g., angular displacement 40) of electronic device 101, including change(s) in angular position, speed, velocity, and/or acceleration, as shown in FIG. 4B. For example, while displaying content 442, electronic device 101 can determine the one or more measures of motion of electronic device 101 via one or more devices such as motion and/or orientation sensors 210, as described with reference to FIG. 2. For example, the one or more measures of motion can include angular displacement (e.g., angular displacement A0), as shown in FIG. 4B. In some examples, electronic device 101 can update the displayed content based on a magnitude of the one or more measures of motion (e.g., angular displacement A0), including displaying the content at increasing depth with increasing magnitude of the one or more measures of motion as well as displaying the content at decreasing depth with decreasing magnitude of the one or more measures of motion. Electronic device 101 can otherwise update the displayed content based on the magnitude of the one or more measures of motion as a matter of design.

In some examples, electronic device 101 can detect the motion of electronic device 101 during the subsequent time period (e.g., a second time period, a third time period, etc.), such as described with reference to FIG. 3C. In some examples, alternatively or in addition to determining depth D4 of fixation point FP4 based on the eye-movement of the user during the subsequent time period, electronic device 101 can determine depth D4 of fixation point FP4 based on motion of electronic device 101 during the subsequent time period. For example, electronic device 101 can track, via one or more input devices (e.g., motion and/or orientation sensors 210), one or more measures of motion of electronic device 101 during the subsequent time period. In some examples, the one or more measures of the motion can include, for example, angular displacement, angular speed or velocity, angular acceleration, and/or the like. Accordingly, electronic device 101 can determine, based on the one or more measures of motion, the depth (e.g., depth D4) of the fixation point (e.g., fixation point FP4) of the user, as shown in FIG. 4B.

In some examples, electronic device 101 can detect the motion of electronic device 101 based on one or more measures of motion of electronic device 101 during the subsequent time period. For example, electronic device 101 can detect the motion of electronic device 101 when the one or more measures of motion exceed a predetermined motion threshold during the subsequent time period. In some examples, the predetermined motion threshold can include a first predetermined motion threshold, a second predetermined motion threshold, and/or the like. For example, electronic device 101 can compare a magnitude of the one or more measures of motion with a value of a predetermined motion threshold to detect the motion of electronic device 101 when, or otherwise, in response to, determining the magnitude of the one or more measures of motion exceeds the value of the predetermined motion threshold. In some examples, the value of the predetermined motion threshold can be selected to correspond to a predetermined magnitude of a measure of angular displacement, angular speed or velocity, angular acceleration, and/or the like. The value of the predetermined motion threshold, including, for example, a value of the predetermined motion threshold, a value of the second predetermined motion threshold, and/or the like, can otherwise be selected as a matter of design.

In some examples, while displaying content 442 and in response to detecting the motion of electronic device 101, electronic device 101 can update the displayed content in the computer-generated environment. For example, updating the displayed content can include determining that the one or more measures of motion of electronic device 101 satisfies one or more criteria. The one or more criteria can include, for example, a first criterion, a second criterion, and/or the like. The one or more criteria can otherwise include criteria corresponding to any motion and/or movement pattern of electronic device 101. For example, the motion and/or movement pattern of electronic device 101 can include motion (e.g., one or more measures of motion corresponding to a movement pattern over an interval) corresponding to the user walking, running, jogging, sprinting, rotating or turning, and/or the like. Other motion and/or movement patterns are possible without departing from the scope of the disclosure.

For example, the one or more criteria can include a criterion (e.g., a first criterion, a second criterion, etc.) that is satisfied when the one or more measures of motion exceeds a predetermined motion threshold. In this example, the criterion can be defined to correspond to the predetermined motion threshold, in which the value of the predetermined motion threshold is selected to correspond to a predetermined magnitude of the one or more measures of motion such that the criterion is satisfied when a magnitude of the one or more measures of motion exceeds the predetermined magnitude (and the motion of electronic device 101 is thereby detected), causing electronic device 101 to display the content (e.g., content 444 and/or content 446) at the subsequent apparent depth (e.g., depth D4). For example, the one or more measures of motion can include one or more measures of angular displacement, angular speed or velocity, angular acceleration, and/or the like, such as shown by angular displacement 40 of FIG. 4B.

As another example, the one or more criteria can include a criterion (e.g., a first criterion, a second criterion, etc.) that is satisfied when the one or more measures of motion exceed a second predetermined motion threshold (e.g., corresponding to a predetermined displacement threshold), a third predetermined motion threshold (e.g., corresponding to predetermined speed threshold), and/or a fourth predetermined motion threshold (e.g., corresponding to predetermined acceleration threshold). In this example, the criterion can be defined to correspond to the second predetermined motion threshold, the third predetermined motion threshold, and/or the fourth predetermined motion threshold, respectively, in which values of the second predetermined motion threshold, the third predetermined motion threshold, and the fourth predetermined motion threshold are respectively selected to correspond to predetermined magnitudes of the one or more measures of motion, such that the criterion is satisfied when a magnitude of any of the one or more measures of motion exceeds the predetermined magnitude (and the motion of electronic device 101 is thereby detected), causing electronic device 101 to display the content (e.g., content 444 and/or content 446) at the subsequent apparent depth (e.g., depth D4). For example, the one or more measures of motion can include one or more measures of angular displacement, angular speed or velocity, angular acceleration, and/or the like, such as shown by angular displacement 40 of FIG. 4B. In this example, when the criterion is satisfied, electronic device 101 can display the content at a second apparent depth, such as the subsequent apparent depth, such that a magnitude of the second apparent depth (e.g., depth D4) is greater than or substantially equal to a magnitude of the first apparent depth (e.g., depth D3 in FIG. 4A), as shown in FIG. 4B.

As another example, the one or more criteria can include a criterion (e.g., a first criterion, a second criterion, etc.) that is satisfied when one or more measures of the motion of the electronic device at least partially correspond to one or more characteristics of a motion profile associated with the user. For example, the one or more characteristics of the motion profile can include characteristics corresponding to a historical movement pattern associated with electronic device 101. In some examples, the historical movement pattern can include historical motion of the user and/or electronic device 101 over an interval. In some examples, the electronic device 101 can detect the motion of electronic device 101 by comparing the one or more measures of the motion of the electronic device over a predetermined interval with the one or more characteristics of the motion profile. In some examples, the one or more measures of the motion of the electronic device can include, for example, motion such as angular displacement, angular speed or velocity, and/or angular acceleration (e.g., of electronic device 101), such as shown by angular displacement 40 of FIG. 4B.

With continued reference to FIG. 4B, electronic device 101 can display, via the one or more displays, the content at the second apparent depth in the computer-generated environment (e.g., three-dimensional environment 400) relative to the viewpoint (e.g., viewpoint 332) of the user. The content can include content 446, as shown in FIG. 4B. For example, electronic device 101 can display content 446 at the second apparent depth (e.g., depth D4) in three-dimensional environment 400, as shown in FIG. 4B. In this example, content 446 can be displayed at the second apparent depth in which a measure of the second apparent depth is measured relative to a portion of the content, such as a center or edge/surface of the content, such as shown in FIG. 4B. In some examples, the second apparent depth can be selected in accordance with a measure of the second depth (e.g., depth D4) of the second fixation point (e.g., fixation point FP4) of the user during the second time period. For example, a magnitude of the second apparent depth can be selected to correspond with a measure of depth D4 of fixation point FP4, as shown in FIG. 4B.

In some examples, content 446 can be displayed at the second apparent depth such that content 446 at least partially coincides with or corresponds to depth D4 and/or a location of fixation point FP4, as shown in FIG. 4B. In some examples, electronic device 101 can display content 446 at the second apparent depth during a time period subsequent to the second time period. For example, the time period subsequent to the second time period can include a third time period ("third time period"). In some examples, the third time period can include, for example, a subsequent time period, and/or the like. In some examples, content 446 can be displayed at the second apparent depth during a third time period subsequent to the second time period. For example, electronic device 101 can display content 446 at the second apparent depth during the third time period in accordance with a measure of depth D4 of fixation point FP4 of the user during the second time period.

As shown in FIGS. 4A-4B, the motion of electronic device 101 can include displacement of electronic device 101, including change(s) in position, speed, velocity, and/or acceleration, such as in linear motion, angular or rotational motion, and/or the like, as described in further detail below. For example, the motion can include angular displacement (e.g., angular displacement A0, etc.), linear displacement (e.g., linear displacement AY1, etc.), and/or any combination of angular and linear displacement, in accordance with examples of the disclosure, as described in further detail herein. As another example, the motion can include movement of the viewpoint of the user. For example, the electronic device can detect radial movement of the viewpoint of the user in a clockwise direction relative to the three-dimensional environment, such as in angular displacement 40 of viewpoint 332 as shown in in FIG. 4B.

Figure 5A:
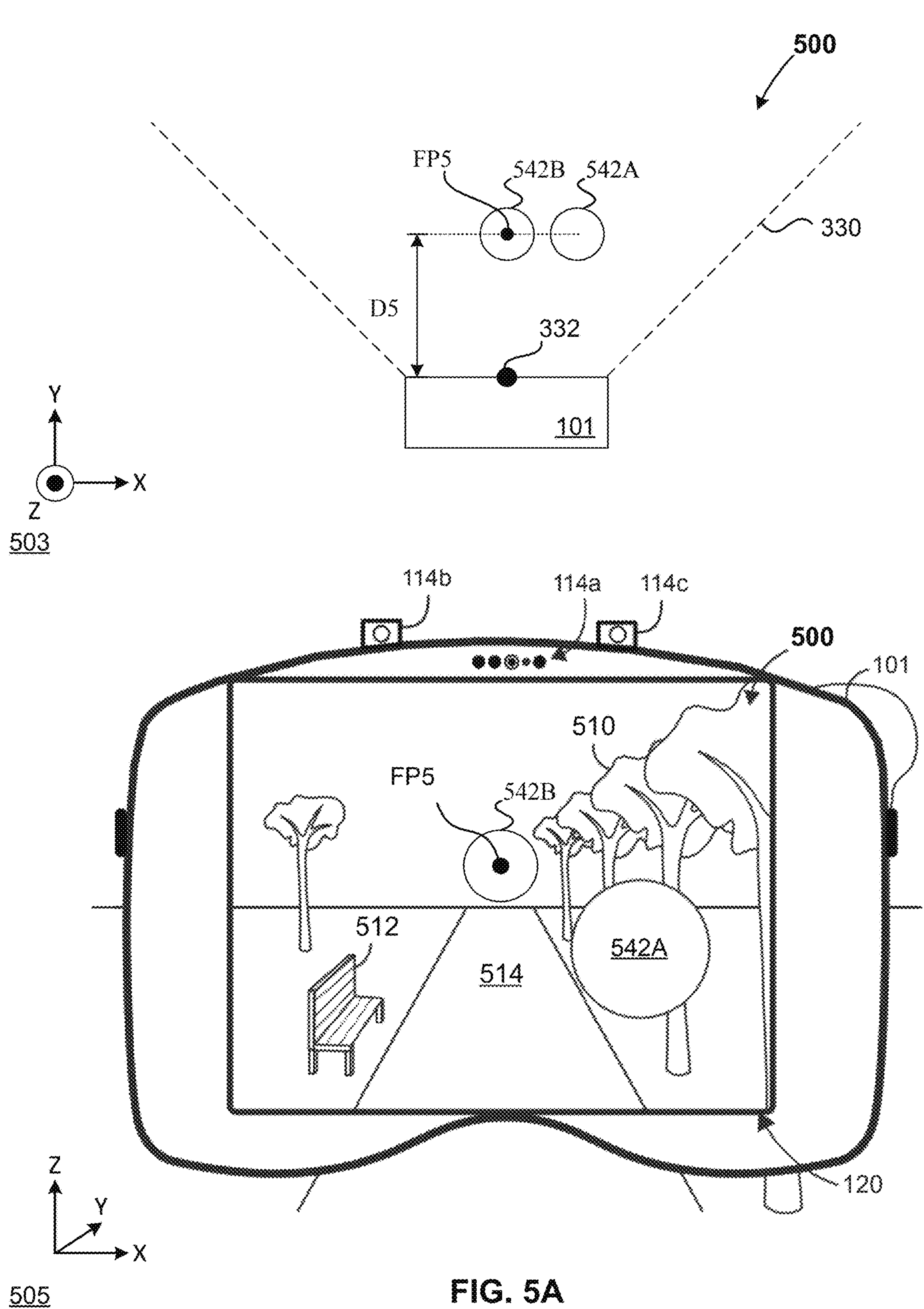
FIGS. 5A-5B illustrate examples of an electronic device in a physical environment during intermediate steps of displaying and updating content at apparent depth(s) in a three-dimensional environment relative to a viewpoint and motion of a user of the electronic device according to some examples of the disclosure.
Figure 5B:
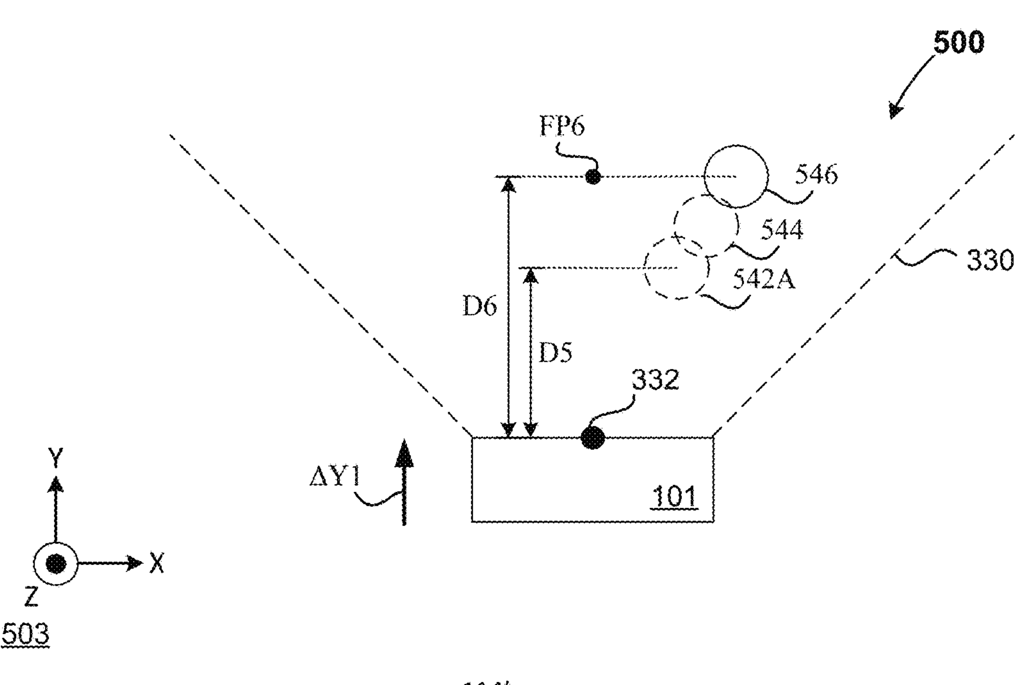
Figure 5B:
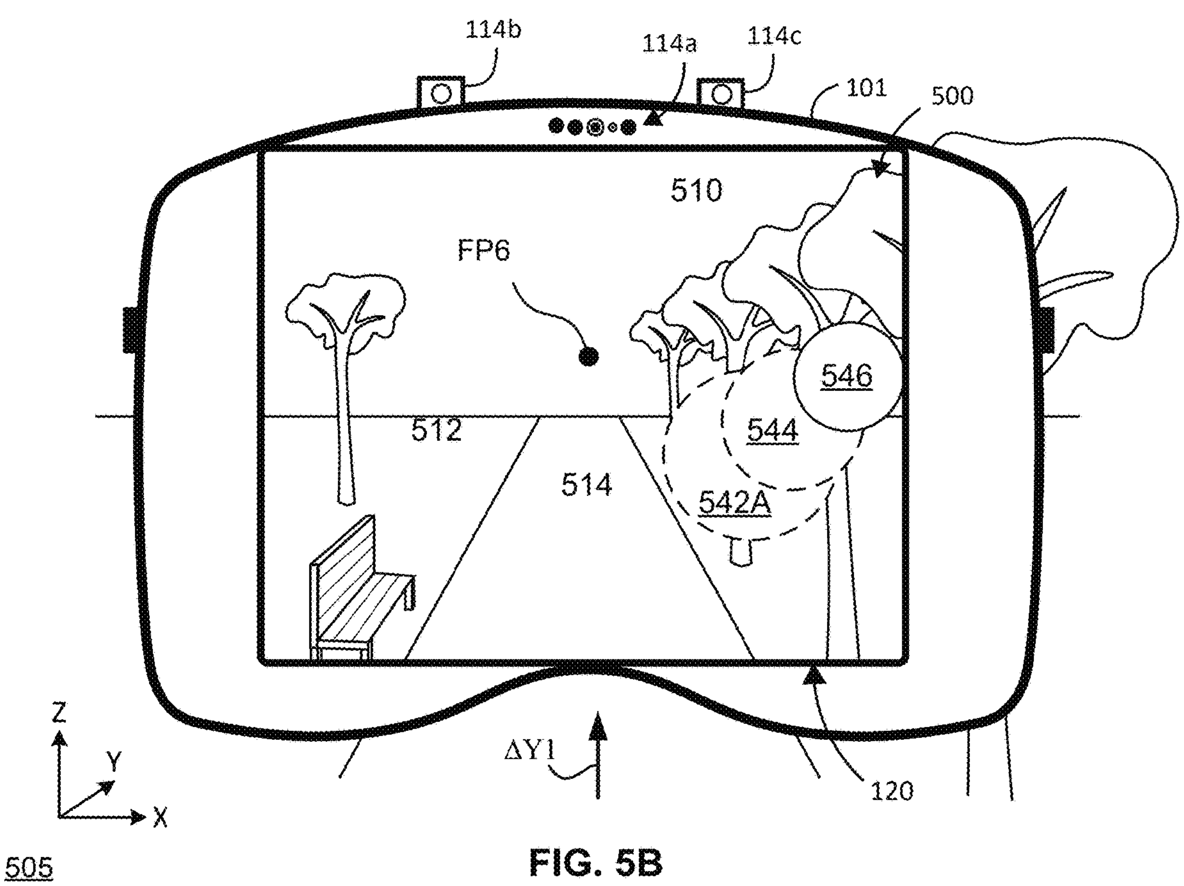

FIGS. 5A-5B illustrate examples of an electronic device in a physical environment during intermediate steps of displaying and updating content at apparent depth(s) in a three-dimensional environment relative to a viewpoint and based on motion of a user of the electronic device according to some examples of the disclosure. The electronic device can include, for example, a device such as electronic device 101 and/or electronic device 201, as described with reference to FIG. 1 and/or FIG. 2. The physical environment can include a physical environment such as shown in FIGS. 5A-5B. For example, electronic device 101, along with object 510 (e.g., a tree), object 512 (e.g., a bench), and path 514 are located in physical environment 500, as shown in FIGS. 5A-5B. Three-dimensional environment 500 represents a three-dimensional environment such as the three-dimensional environment (e.g., three-dimensional environment 100, three-dimensional environment 300, or three-dimensional environment 400), such as described with reference to FIGS. 1, 3A-3D, and/or 4A-4B. Three-dimensional environment 500 can include content (e.g., content 542, content 544, content 546, etc.), as described herein. FIGS. 5A-5B show examples of motion-based, body-locked content. In some examples, content 542, content 544, and/or content 546 can include, for example, motion-locked content, as described herein.

FIGS. 5A-5B illustrate top-down views and the user's views of three-dimensional environment 500 and correspond in terms of orientation with the top-down views and the user's views of three-dimensional environment 300, as described with reference to FIGS. 3A-3D. For example, the top-down views are oriented with respect to reference frame 503 and show, from above: electronic device 101 in three-dimensional environment 500, including field of view 330, viewpoint 332, angle 334, and fixation point FP5. As another example, the user's views are oriented with respect to reference frame 505 and show, from the user's perspective and field of view 330 at viewpoint 332: three-dimensional environment 500, including representations of objects in the physical environment, such as object 510, object 512, and path 514. FIGS. 5A-5B illustrate examples of motion of the user of the electronic device, including motion corresponding at least partially to linear displacement in a direction parallel with the Y-axis of reference frames 503 and 505. For example, the motion can include motion along a path in which the user is walking, running, jogging, or otherwise moving.

With reference to FIG. 5A, electronic device 101 can determine a depth of a fixation point of the user, such as described with reference to FIGS. 3A-3D and/or FIGS. 4A-4B. For example, the fixation point can include an initial fixation point (e.g., fixation point FP5) of the user. In some examples, the initial fixation point can include an initial fixation point (e.g., fixation point FP5) at a first depth (e.g., depth D5). In some examples, electronic device 101 can determine depth D5 of fixation point FP5 based on eye-movement of the user during an initial time period. The initial time period can include, for example, a first time period, a second time period, and/or the like, as described herein. Fixation point FP5 corresponds to an initial fixation point of the user in three-dimensional environment 500 during the first time period, and depth D5 corresponds to a depth (e.g., a first depth, etc.) of the initial fixation point (e.g., fixation point FP5).

In some examples, electronic device 101 can determine depth D5 of fixation point FP5 based on eye orientation and/or eye-movement of the user during the initial time period (e.g., the first time period), such as described with reference to FIGS. 3A-3D and/or FIGS. 4A-4B. Accordingly, electronic device 101 can determine, based on an initial measure of vergence, the initial depth (e.g., depth D5) of the initial fixation point (e.g., fixation point FP5) of the user, as shown in FIG. 5A.

With continued reference to FIG. 5A, electronic device 101 can display, via the one or more displays, content at a first apparent depth in a computer-generated environment (e.g., three-dimensional environment 500) relative to a viewpoint (e.g., viewpoint 332) of the user, such as described with reference to FIG. 3B. The content can include content 542, content 544, and/or content 546, as shown in FIGS. 5A-5B. In some examples, the first apparent depth can include an initial apparent depth, as described herein. For example, electronic device 101 can display content 542 at the first apparent depth in three-dimensional environment 500 relative to viewpoint 332, as shown in FIG. 5A. In some examples, the first apparent depth can be selected in accordance with a measure of the depth (e.g., depth D5) of the fixation point (e.g., fixation point FP5) of the user during the first time period. For example, a magnitude of the first apparent depth can be selected to correspond with a measure of depth D5 of fixation point FP5, as shown in FIGS. 5A-5B.

In some examples, electronic device 101 can display content 542 at the first apparent depth such that content 542 at least partially coincides or corresponds with depth D5 and/or a location of fixation point FP5, as shown in FIGS. 5A-5B. For example, electronic device 101 can display content 542B at the first apparent depth such that content 542B at least partially coincides or corresponds with depth D5 and/or the location of fixation point FP5, as shown in FIG. 5A. As another example, electronic device 101 can display content 542A at the first apparent depth such that content 542A is displayed to at least partially coincide or correspond with depth D5 at a location offset from the location of fixation point FP5, such as shown in FIG. 5A. In some examples, electronic device 101 can display content 542 at the first apparent depth during a time period subsequent to the first time period, such as described herein with reference to FIGS. 3A-3D and/or FIGS. 4A-4B. For example, electronic device 101 can display content 542 at the first apparent depth during a second time period subsequent to the first time period. In some examples, electronic device 101 can display content 542 at the first apparent depth during the second time period in accordance with a measure of depth D5 of fixation point FP5 of the user during the first time period.

With reference to FIG. 5B, electronic device 101 can display, via the one or more displays, the content at a second apparent depth different from the first apparent depth in the computer-generated environment (e.g., three-dimensional environment 500) relative to the viewpoint (e.g., viewpoint 332) of the user. The content can include content 544 and/or content 546, as shown in FIG. 5B. In some examples, content 544 and/or content 546 can include content such as content 344 and/or content 346, such as described with reference to FIGS. 3A-3D. For example, content 544 and/or content 546 can include content corresponding to content 542, as described herein. In some examples, electronic device 101 can, while displaying content 542 (e.g., at the first apparent depth) and in response to detecting a change in location of gaze of the user, such as discussed above with reference to FIG. 3C, update the displayed content, including displaying the content at the second apparent depth, as shown in FIG. 4B. For example, the second apparent depth can include a subsequent apparent depth such as a second apparent depth, a third apparent depth, and/or the like, as described herein.

In some examples, electronic device 101 can display content 546 at the second apparent depth such that content 546 at least partially coincides or corresponds with depth D6 and/or a location of fixation point FP6, as shown in FIG. 5B. Fixation point FP6 corresponds to a subsequent fixation point of the user in three-dimensional environment 500 during the subsequent time period (e.g., the second time period, etc.), and depth D6 corresponds to a depth of the subsequent fixation point (e.g., fixation point FP6), such as described with reference to fixation point FP2 and depth D2 of FIG. 3C. For example, depth D6 represents a measure or magnitude of the depth (e.g., depth D6) of the subsequent fixation point (e.g., fixation point FP6) during the subsequent time period (e.g., the second time period, etc.) relative to the depth (e.g., depth D5) of the initial fixation point (e.g., fixation point FP5) during the initial time period (e.g., the first time period, etc.), as shown in FIG. 5B.

In some examples, electronic device 101 can determine depth D6 of fixation point FP6 based on eye orientation and/or eye-movement of the user during the subsequent time period, such as described with reference to fixation point FP2 and depth D2 of FIG. 3C. For example, electronic device 101 can determine, based on the second measure of vergence, the second depth (e.g., depth D6) of the second fixation point (e.g., fixation point FP6) of the user, as shown in FIG. 5B. Accordingly, electronic device 101 can display the content at the second apparent depth during a time period subsequent to the second time period, including, for example, a third time period subsequent to the second time period, a fourth time period subsequent to the second time period and/or the third time period, and/or the like.

In some examples, while displaying content 542 (e.g., during the subsequent time period), electronic device 101 can detect motion of electronic device 101 in the physical environment. In some examples, in response to detecting motion (e.g., of electronic device 101) in the physical environment, electronic device 101 can update the displayed content, including displaying the content at the second apparent depth, as shown in FIG. 5B. For example, electronic device 101 can detect the motion based on one or more measures of motion of electronic device 101. In some examples, the one or more measures of motion can include, for example, one or more measures of linear displacement (e.g., linear displacement AY1, etc.) of electronic device 101, including change(s) in linear position, speed, velocity, and/or acceleration, as shown in FIG. 5B. For example, while displaying content 542, electronic device 101 can determine the one or more measures of motion of electronic device 101 via one or more input devices such as motion and/or orientation sensors 210, as described with reference to FIG. 2. For example, the one or more measures of motion can include linear displacement (e.g., linear displacement AY1, etc.), as shown in FIG. 5B. In some examples, electronic device 101 can update the displayed content based on a magnitude of the one or more measures of motion (e.g., linear displacement AY1), including displaying the content at increasing depth with increasing magnitude of the one or more measures of motion as well as, conversely, displaying the content at decreasing depth with decreasing magnitude of the one or more measures of motion. Electronic device 101 can otherwise update the displayed content based on the magnitude of the one or more measures of motion as a matter of design.

In some examples, electronic device 101 can detect the motion of electronic device 101 during the subsequent time period (e.g., a second time period, a third time period, etc.), such as described with reference to FIG. 3C. In some examples, alternatively or in addition to determining depth D6 of fixation point FP6 based on the eye orientation and/or eye-movement of the user during the subsequent time period, electronic device 101 can determine depth D6 of fixation point FP6 based on motion of electronic device 101 during the subsequent time period. For example, electronic device 101 can track, via one or more input devices (e.g., motion and/or orientation sensors 210), one or more measures of motion of electronic device 101 during the subsequent time period. In some examples, the one or more measures of the motion can include, for example, linear displacement, linear speed or velocity, linear acceleration, and/or the like. Accordingly, electronic device 101 can determine, based on the one or more measures of motion, the depth (e.g., depth D6) of the fixation point (e.g., fixation point FP6) of the user, as shown in FIG. 5B.

In some examples, electronic device 101 can detect the motion of electronic device 101 based on one or more measures of motion of electronic device 101 during the subsequent time period. For example, electronic device 101 can detect the motion of electronic device 101 when the one or more measures of motion exceed a predetermined motion threshold during the subsequent time period, such as described herein with reference to FIGS. 4A-4B. For example, the predetermined motion threshold can include a first predetermined motion threshold, a second predetermined motion threshold, and/or the like. For example, electronic device 101 can compare a magnitude of the one or more measures of motion with a value of a predetermined motion threshold to detect the motion of electronic device 101 when, or otherwise, in response to, determining the magnitude of the one or more measures of motion exceeds the value of the predetermined motion threshold. In some examples, the value of a predetermined motion threshold can be selected to correspond to a predetermined magnitude of a measure of linear displacement, linear speed or velocity, linear acceleration, and/or the like. The value of the predetermined motion threshold, including, for example, a value of the predetermined motion threshold, a value of the second predetermined motion threshold, and/or the like, can otherwise be selected as a matter of design.

In some examples, alternatively or in addition to selecting the value of the predetermined motion threshold to correspond to the predetermined magnitude of the measure of angular displacement (e.g., such as described with reference to FIGS. 4A-4B), and/or the like, a value of a predetermined motion threshold can be selected to correspond to a predetermined magnitude of a measure of linear displacement, linear speed or velocity, linear acceleration, and/or the like. In some examples, alternatively or in addition to selecting the value of the predetermined motion threshold to correspond to the predetermined magnitude of the measure of angular displacement, the predetermined magnitude of the measure of linear displacement, and/or any combination thereof, a value of a predetermined motion threshold can be selected to correspond to a predetermined magnitude of a measure of a combination of angular displacement, linear displacement, and/or the like. The value of such predetermined motion threshold(s) can otherwise be selected as a matter of design.

In some examples, while displaying content 542 and in response to detecting the motion of electronic device 101, electronic device 101 can update the displayed content in the computer-generated environment. For example, updating the displayed content can include determining that the one or more measures of motion of electronic device 101 satisfies one or more criteria. The one or more criteria can include, for example, a first criterion, a second criterion, and/or the like. The one or more criteria can otherwise include criteria corresponding to any motion and/or movement pattern of the user. For example, the motion and/or movement pattern of electronic device 101 can include motion corresponding to the user walking, running, jogging, sprinting, rotating or turning, and/or the like. Other motion and/or movement patterns are possible without departing from the scope of the disclosure.

For example, the one or more criteria can include a criterion (e.g., a first criterion, a second criterion, etc.) that is satisfied when the one or more measures of motion exceeds a predetermined motion threshold. In this example, the criterion can be defined to correspond to the predetermined motion threshold, in which the value of the predetermined motion threshold is selected to correspond to a predetermined magnitude of the one or more measures of motion, such that the criterion is satisfied when a magnitude of the one or more measures of motion exceeds the predetermined magnitude (and the motion of electronic device 101 is thereby detected), causing electronic device 101 to display the content (e.g., content 544 and/or content 546) at the subsequent apparent depth (e.g., depth D6 in FIG. 5B). For example, the one or more measures of motion can include one or more measures of linear displacement, linear speed or velocity, linear acceleration, and/or the like, such as shown by linear displacement AY1 of FIG. 5B. As another example, the one or more measures of motion can include a combination of one or more measures of linear displacement (e.g., linear displacement AY1, etc.) and one or more measures of angular displacement (e.g., angular displacement A0, etc.), such as described with reference to FIG. 4B and/or FIG. 5B.

As another example, the one or more criteria can include a criterion (e.g., a first criterion, a second criterion, etc.) that is satisfied when the one or more measures of motion exceed a second predetermined motion threshold (e.g., corresponding to a predetermined displacement threshold), a third predetermined motion threshold (e.g., corresponding to a predetermined speed threshold), and/or a fourth predetermined motion threshold (e.g., corresponding to a predetermined acceleration threshold), such as described with reference to FIG. 4B. For example, the one or more measures of motion can include one or more measures of linear displacement, linear speed or velocity, linear acceleration, and/or the like, such as shown by linear displacement AY1 of FIG. 5B. In this example, when the criterion is satisfied, electronic device 101 can display the content at a second apparent depth, such as the subsequent apparent depth, such that a magnitude of the second apparent depth (e.g., depth D6) is greater than or substantially equal to a magnitude of the first apparent depth (e.g., depth D5 in FIG. 5A), as shown in FIG. 5B.

In some examples, the one or more criteria can include a criterion (e.g., a first criterion, a second criterion, etc.) that is satisfied when one or more measures of the motion of the electronic device at least partially correspond with one or more characteristics of a motion profile associated with the user. In some examples, the one or more characteristics of the motion profile can include characteristics corresponding to (i) a movement pattern corresponding to motion of electronic device 101 over a predetermined interval, (ii) motion of the electronic device along a predetermined path, (iii) an activity associated with the user, and/or the like.

For example, the one or more characteristics of the motion profile can include characteristics corresponding to a historical movement pattern associated with electronic device 101. In some examples, the historical movement pattern can include historical motion of the user and/or electronic device 101 over an interval. In some examples, the electronic device 101 can detect the motion of electronic device 101 by comparing the one or more measures of the motion of the electronic device over a predetermined interval with the one or more characteristics of the motion profile. In some examples, the one or more measures of the motion of the electronic device can include, for example, motion such as linear displacement, linear speed or velocity, and/or linear acceleration (e.g., of electronic device 101), such as shown by linear displacement AY1 of FIG. 5B.

As another example, the criterion can be defined to correspond to motion and/or a movement pattern of electronic device 101 over an interval, including, for example, motion and/or series of movements (e.g., historical movements associated with electronic device 101, generic movements associated with a user of electronic device 101, etc.). In this example, the criterion can be defined to correspond to the series of movements such that the criterion is satisfied when a similarity score ("similarity measure" or "similarity score") corresponding to a degree of similarity between the one or more measures of motion over a predetermined interval and the motion and/or a movement pattern of electronic device 101 over the interval exceeds a predetermined score threshold. The value of such predetermined score threshold(s) can otherwise be selected as a matter of design. In some examples, the motion and/or series of movements can include motion corresponding to an activity associated with the user.

In some examples, the motion profile can include, for example, a characteristic corresponding to motion of the electronic device along a predetermined path. For example, the motion profile can include a characteristic corresponding to motion of electronic device 101 from a first location to a second location over an interval. In some examples, the motion of electronic device 101 from the first location to the second location can include motion along a path at least partially corresponding to the predetermined path. For example, the path can at least partially correspond to the predetermined path in terms of distance, shape, and/or the like.

Figures 6, 7:
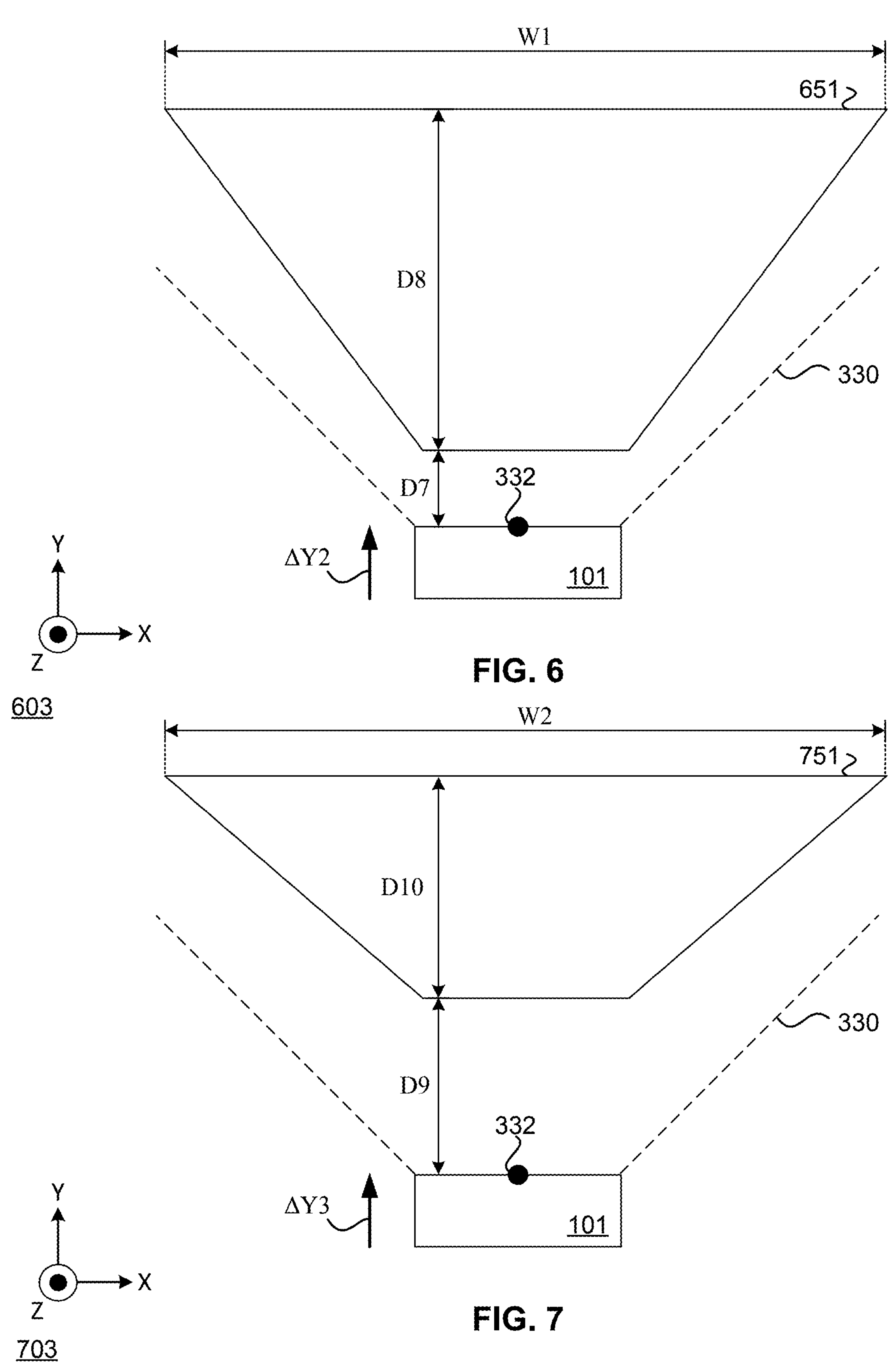
FIG. 6 illustrates an example of an electronic device in a physical environment during an intermediate step of displaying and updating content in a three-dimensional environment relative to a target viewing range according to some examples of the disclosure.
FIG. 7 illustrates an example of an electronic device in a physical environment during an intermediate step of displaying and updating content in a three-dimensional environment relative to a target viewing range according to some examples of the disclosure.

FIG. 6 illustrates an example of an electronic device in a physical environment during an intermediate step of displaying and updating content in a three-dimensional environment relative to a target viewing range according to some examples of the disclosure. FIG. 7 illustrates an example of an electronic device in a physical environment during an intermediate step of displaying and updating content in a three-dimensional environment relative to a target viewing range according to some examples of the disclosure. The electronic device can include, for example, a device such as electronic device 101 and/or electronic device 201, as described with reference to FIG. 1 and/or FIG. 2.

FIGS. 6 and 7 illustrate top-down views of three-dimensional environment 600 and three-dimensional environment 700, respectively. The top-down views are respectively oriented with respect to reference frame 603 and reference frame 703 (i.e., in a direction parallel with the Z-axis) and show, from above: electronic device 101 in three-dimensional environment 600 and three-dimensional environment 700, respectively, including the extent of the user's field of view 330 (shown by dashed lines) and viewpoint 332. As shown in FIG. 6, the top-down view additionally shows, from above, motion of electronic device 101 in a direction parallel with the Y-axis of reference frame 603 as well as target viewing zone 651, including depth D7 and depth D8. As shown in FIG. 6, the top-down view additionally shows, from above, motion of electronic device 101 in a direction parallel with the Y-axis of reference frame 703 as well as target viewing zone 751, including depth D9 and depth D10.

In some examples, electronic device 101 can display, via the one or more displays, content at an apparent depth within a target viewing zone (e.g., target viewing zone 651, target viewing zone 751, etc.) in the computer-generated environment (e.g., three-dimensional environment 600, three-dimensional environment 700, etc.) relative to the viewpoint (e.g., viewpoint 332) of the user. In some examples, electronic device 101 can be configured to display the content within the target viewing zone such that the content is displayed at an apparent depth located beyond a minimum depth (e.g., depth D7, depth D9) and within a maximum depth (e.g., depth D8, depth D10), as shown in FIGS. 6 and 7. Accordingly, the user may view virtual objects with an acceptable level of comfort when the virtual objects are displayed within the target viewing zone. FIGS. 6 and 7 illustrate top-down views of illustrative XR environments showing target viewing zone 651 and target viewing zone 751. As shown in FIGS. 6 and 7, target viewing zone 651 and target viewing zone 751 can include, for example, maximum comfortable apparent depths D8 and D10, as well as minimum comfortable apparent depths D7 and D9. In some examples, electronic device 101 can be configured to display content within target viewing zone 651 and target viewing zone 751 based on motion of electronic device 101 in the physical environment.

In some examples, the one or more criteria can include a criterion that is satisfied when one or more measures of the motion of the electronic device exceeds a predetermined motion threshold. For example, a value of a predetermined motion threshold can be selected to correspond to a predetermined magnitude of a measure of linear displacement of electronic device 101, such as a velocity of electronic device 101 in a direction parallel with the Y-axis of reference frame 603. In this example, when the one or more measures of the motion of the electronic device fails to exceed the predetermined motion threshold, including, for example, a predetermined magnitude corresponding to a measure of linear displacement (e.g., velocity in a direction parallel with Y-axis) of electronic device 101 in a direction parallel with the Y-axis of reference frame 603, parameters of target viewing zone 651 can be configured to cause electronic device 101 to display content within a larger acceptable volume, at a position located closer to the user (e.g., relative to viewpoint 332), such as shown in FIG. 6. In this example, the user may be at rest. As another example, when the one or more measures of the motion of the electronic device exceeds the predetermined motion threshold, including, for example, a predetermined magnitude corresponding to a measure of linear displacement (e.g., velocity in a direction parallel with Y-axis) of electronic device 101 in a direction parallel with the Y-axis of reference frame 603, parameters of target viewing zone 751 can be configured to cause electronic device 101 to display content within a smaller acceptable volume, at a position located further away from the user (e.g., relative to viewpoint 332), such as shown in FIG. 7. In this example, the user may be in motion (e.g., walking, running, etc.). Accordingly, electronic device 101 can be configured to display content at an apparent depth within the target viewing zone (e.g., target viewing zone 651, target viewing zone 751) to facilitate viewing comfort for the user. The maximum comfortable apparent depths may sometimes be referred to as maximum allowable apparent depths D8 and/or D10 while the minimum comfortable apparent depths may sometimes be referred to as minimum allowable apparent depths D7 and/or D9.

For example, electronic device 101 can be configured to display content within target viewing zone 651 in response to determining that the one or more measures of motion of electronic device 101 fail to exceed the predetermined motion threshold corresponding to the measure of linear displacement (e.g., velocity in a direction parallel with Y-axis) of electronic device 101 in the direction parallel with the Y-axis of reference frame 603, such as shown in FIG. 6. As another example, electronic device 101 can be configured to display content within target viewing zone 751 in response to determining that the one or more measures of motion of electronic device 101 exceed the predetermined motion threshold corresponding to the measure of linear displacement (e.g., velocity in a direction parallel with Y-axis) of electronic device 101 in the direction parallel with the Y-axis of reference frame 703, such as shown in FIG. 7.

As another example, electronic device 101 can be configured to display content within target viewing zone 651 in response to determining that the one or more measures of motion of electronic device 101 correspond to a characteristic of the motion profile associated with or indicative of the user being at rest. In this example, the characteristic can include, for example, a characteristic corresponding to a motion event in which motion of electronic device 101 at a particular location is identified. In some examples, a physical object in the XR environment may be positioned at a depth (e.g., relative to viewpoint 332) that is greater than the maximum allowable apparent depths D8 and/or D10. In this example, electronic device 101 can display content at an apparent depth that is equal to the maximum allowable apparent depths D8 and/or D10. In some examples, the apparent location at which content such as head-locked or body-locked content is displayed in the XR environment can be set to have a depth that is equal to the maximum allowable apparent depths D8 and/or D10, the minimum allowable apparent depths D7 and/or D9, or any value in between.

In some examples, electronic device 101 can display content at an apparent depth substantially coinciding with a surface of an object, such as shown and described with reference to table 106 of FIG. 4A. For example, the apparent depth can be modified (e.g., adjusted) when a physical object aligned or substantially coinciding with a location of the content to be displayed is located outside the target viewing zone. Consider the example of FIGS. 4A-4B. Displaying content at an apparent depth corresponding to fixation point FP3 may cause the viewer discomfort (because the virtual object will appear to be 'inside' table 106). To mitigate viewer discomfort in this type of scenario, the display of the content may be adjusted. Possible adjustments include displaying the content relative to a surface of table 106 (e.g., such as displaying the content so as to appear to be resting on the surface of table 106, etc.) changing the size of the content (e.g., making the content smaller or larger), changing the opacity of the content (e.g., fading out the content), displaying a warning or other discomfort indicator (e.g., a red dot, warning text, etc.) instead of or in addition to the content, applying a visual effect (e.g., a blur, feathering, mask, etc.) to the edges of or surrounding the content, etc.

As shown and discussed in connection with FIGS. 4A-4B, the apparent depth of content such as a head-locked or body-locked virtual object can be adjusted to match the depth (e.g., relative to viewpoint 332) of an object aligned with the virtual object. This results in real-time changes to the apparent depth of the virtual object as the user rotates their head and aligns the virtual content with objects at varying depths. To ensure a seamless experience for the user when viewing virtual content at varying depths, the size of the content in electronic device 101 may be updated such that the apparent size (e.g., size of the object in screen space or amount of screen occupied by the object) of the virtual content when viewed by the user remains constant. In addition to maintaining a constant apparent size with varying apparent depths, the alignment of the images used to display the virtual object may be adjusted with varying apparent depths. First and second displays may display first and second images that are viewed by first and second eyes of the user to perceive the virtual object. At closer apparent depths, the first and second images may be separated by a smaller distance than at farther apparent depths.

In some examples, an updating frequency corresponding to predetermined frequency of update cycles or number of updates or changes to the apparent depth per unit time can be configured to enable and provide transition period during which alignment of the images used to display the virtual object can be performed gradually or otherwise at a predetermined rate. This transition period can be defined to simulate the performance of the human eye and produce a more natural viewing experience for the user. The transition period may have a duration of at least 5 milliseconds, at least 50 milliseconds, at least 100 milliseconds, at least 200 milliseconds, at least 300 milliseconds, at least 500 milliseconds, less than 500 milliseconds, less than 1 second, less than 300 milliseconds, between 200 milliseconds and 400 milliseconds, between 250 milliseconds and 350 milliseconds, between 50 milliseconds and 1 second, etc. The alignment and/or apparent depth of the virtual object may change gradually throughout the transition period.

Figure 8:
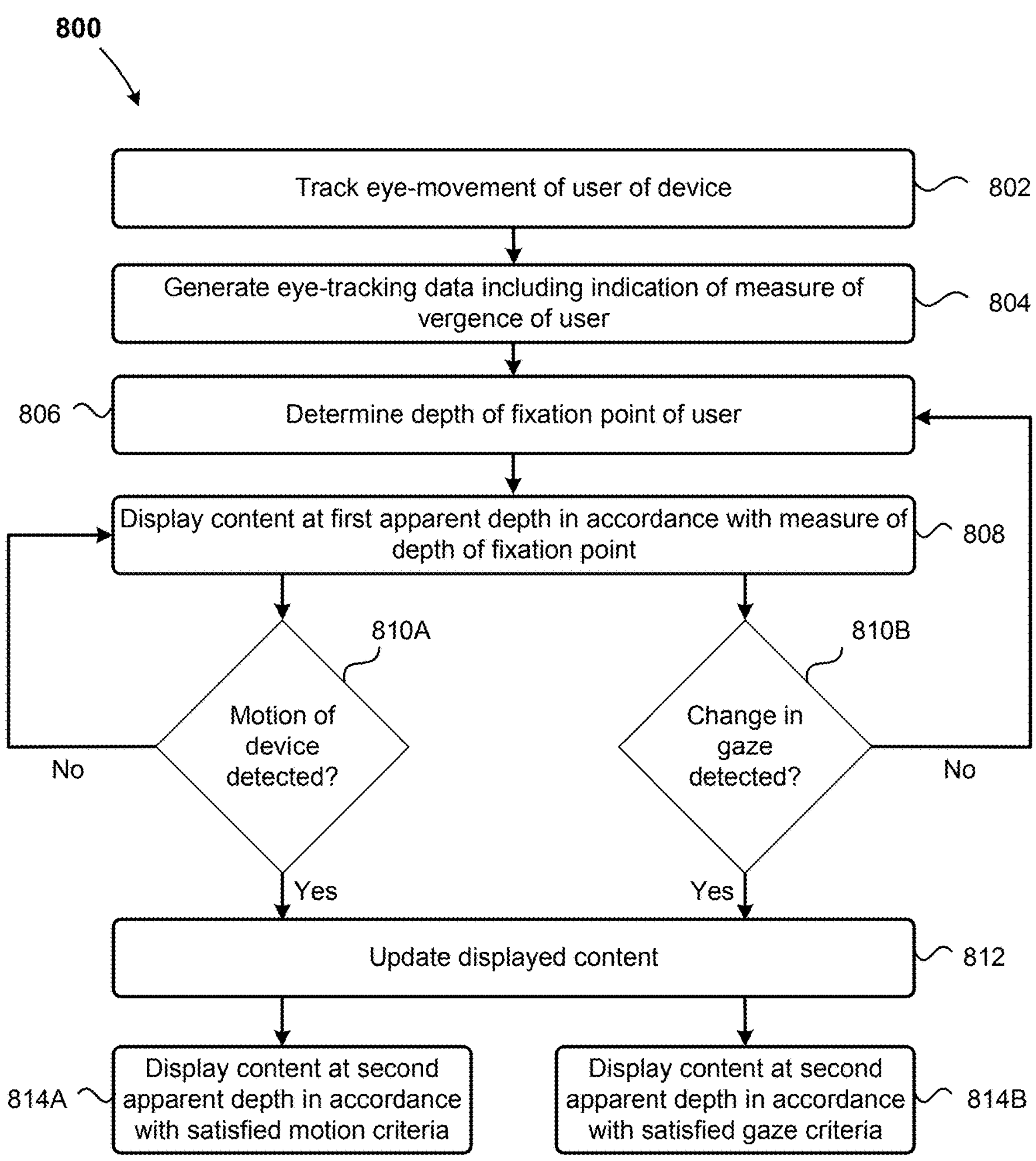
FIG. 8 is a flow chart depicting an example method for displaying and updating a three-dimensional environment at an electronic device in a physical environment according to some examples of the disclosure.

FIG. 8 is a flow chart depicting an example method for displaying and updating a three-dimensional environment including content at an electronic device in a physical environment according to some examples of the disclosure. The method 800 can be implemented, performed, or otherwise executed, for example, at an electronic device (e.g., electronic device 101 and/or electronic device 201) in communication with one or more displays (e.g., display(s) 214) and one or more input devices (e.g., sensor(s) 212, 210, 204). The three-dimensional environment can include, for example, an XR environment such as three-dimensional environment 300, three-dimensional environment 400, and/or three-dimensional environment 500, as described herein. The content can include content (e.g., content 342, content 344, content 346, content 442, content 444, content 446, content 542, content 544, content 546, etc.), as described herein.

At 802, method 800 can include, for example, tracking, via the one or more input devices, eye-movement of a user of the electronic device. The one or more input devices can include, for example, one or more eye tracking sensor(s) such as eye tracking sensor 212 of FIG. 2. For example, the electronic device can implement the one or more eye tracking sensor(s) to track the eye-movement of the user and generate corresponding data (e.g., eye-tracking data). For example, the eye-tracking data can be generated by tracking, via the one or more input devices (e.g., one or more eye tracking sensor(s), eye-movement of the user during a time period and the eye-tracking data can include data corresponding to the tracked eye-movement of the user during the time period, such as described with reference to FIGS. 3A-3D, FIGS. 4A-4B, and/or FIGS. 5A-5B. The time period can include, for example, an initial time period such as a first time period, a subsequent time period such as a second time period subsequent to the first time period, and so on.

At 804, method 800 can include, for example, generating, based on the eye-movement of the user, eye-tracking data including an indication of a measure of vergence. In some examples, the eye-tracking data can include one or more indications of a measure of vergence of the user. For example, the one or more indications of the measure of vergence can include one or more discrete and/or continuous indications of the measure of vergence. In some examples, generating the eye-tracking data can include, for example, generating the eye-tracking data based on eye-movement that is tracked during a first time period and/or a second or subsequent time period, such as described with reference to FIGS. 3A-3D, FIGS. 4A-4B, and/or FIGS. 5A-5B. Accordingly, generating the eye-tracking data can include generating the eye-tracking data, including, for example, one or more indication(s) of a measure of vergence of the user. For example, the eye-tracking data can include an indication of a first measure of vergence of the user (e.g., during a first time period), an indication of a second measure of vergence of the user (e.g., during a second time period subsequent to the first time period, an indication of a subsequent measure of vergence of the user (e.g., based on eye-movement tracked over an interval during the first time period, based on eye-movement tracked over an interval during the second time period, based on eye-movement tracked over an interval intervening the first time period and the second time period etc.)), and so on.

At 806, method 800 can include, for example, determining, based on the measure of vergence, a depth of a fixation point (e.g., fixation point FP1, fixation point FP3, fixation point FP5, etc.) of the user. For example, electronic device 101 can determine the depth of fixation point FP1 based on eye-tracking data including an indication of a measure of vergence of the user, such as described with reference to FIGS. 3A-3D, FIGS. 4A-4B, and/or FIGS. 5A-5B. In some examples, the depth of the fixation point can be determined based on eye-tracking data corresponding to movement of the user's eyes during a first time period. In some examples, the eye-tracking data associated with the movement of the user's eyes during the first time period can include one or more indications of a measure of vergence of the user. In some examples, the depth of the fixation point of the user can be determined based on the one or more indications of the measure of vergence. For example, a measure of depth D1 of fixation point FP1 during the first time period can be determined based on eye-tracking data including an indication of a measure of vergence of the user during the first time period. For example, a depth of a first fixation point (e.g., FP1) can be determined based on a first indication of a measure of vergence of the user. As another example, a depth of a second or subsequent fixation point (e.g., FP2, FP3, FP4, etc.) can be determined based on a second or subsequent indication of a measure of vergence of the user.

In some examples, such as in instances when reliable or sufficient vergence data is unavailable, or when usable vergence is otherwise absent, method 800 can include, for example, at 806, determining, based on a measure of a location of an object in the physical environment, a depth of the object relative to the viewpoint (e.g., viewpoint 332) of the user. In some examples, the object in the environment can include a physical object located in the environment, a virtual object located in the three-dimensional environment, and/or the like. For example, determining the depth of the object relative to the viewpoint of the user can be performed in lieu of determining the depth of the fixation point of the user in response to determining that the vergence data is absent or otherwise insufficient for use in determining the depth of the fixation point of the user. In some examples, determining the depth of the object relative to the viewpoint of the user can include implementing simultaneous localization and mapping (SLAM) to determine a location and/or depth of an object in a field of view of the user. For example, in some instances, when reliable or sufficient vergence data is unavailable, or when usable vergence data is otherwise absent, method 800 can include generating and/or otherwise implementing a SLAM map to identify an object in the field of view of the user in response to determining a location of the object substantially coincides or corresponds to a line of sight of the user. Accordingly, in some examples, method 800 can include, at 806, determining, based on a measure of the location of the object in the physical environment, a depth of the object relative to the viewpoint (e.g., viewpoint 332) of the user. The particular mapping and/or localization techniques can otherwise be chosen as a matter of design.

At 808, method 800 can include, for example, displaying, via the one or more displays, content at a first apparent depth in a computer-generated environment relative to a viewpoint of the user. In some examples, the first apparent depth can be selected in accordance with a measure of the depth of the fixation point of the user during a first time period, such as described with reference to FIGS. 3A-3D, FIGS. 4A-4B, and/or FIGS. 5A-5B. For example, the first apparent depth can be selected in accordance with a measure of the depth (e.g., depth D1) of the fixation point (e.g., fixation point FP1) of the user during the first time period. In some examples, the content can be displayed during a second time period subsequent to the first time period. For example, electronic device 101 can display content (e.g., content 342, content 442, content 542, etc.) at the first apparent depth during a second time period subsequent to the first time period. In some examples, the content can include head-locked content, body-locked content, tilt-locked content, and/or the like, as defined herein.

At 810A, method 800 can include, for example, detecting motion of the electronic device in a physical environment of the electronic device. In some examples, the motion of the electronic device in the physical environment can be detected while displaying the content (e.g., the motion can be detected while displaying the content at the first apparent depth), such as described with reference to FIGS. 4A-4B and/or FIGS. 5A-5B. In some examples, when the motion of the electronic device in the physical environment is detected, method 800 proceeds to 812, in which the displayed content is updated, such as described with reference to FIGS. 4A-4B and/or FIGS. 5A-5B. In some examples, if motion is not detected, method 800 proceeds to 808, in which the electronic device (e.g., electronic device 101) continues displaying, via the one or more displays, content at the first apparent depth in the computer-generated environment (e.g., three-dimensional environment 300, 400, 500) relative to the viewpoint (e.g., viewpoint 332) of the user.

At 812, method 800 can include, for example, updating the displayed content, including updating the content displayed at the first apparent depth. In some examples, updating the content displayed at the first apparent depth can include, for example, moving content in the three-dimensional environment (e.g., three-dimensional environment 300, three-dimensional environment 400, three-dimensional environment 500, etc.) with or without a delay, such as described with reference to FIGS. 3A-3D.

At 814A, method 800 can include, for example, displaying, via the one or more displays, the content at a second apparent depth different from the first apparent depth in the computer-generated environment relative to the viewpoint of the user. In some examples, the content can be displayed at the second apparent depth in accordance with a determination that the motion satisfies one or more criteria, such as described with reference to FIGS. 4A-4B and/or FIGS. 5A-5B. In some examples, the one or more criteria can include, for example, a first criterion that is satisfied when one or more measures of the motion of the electronic device exceeds a predetermined motion threshold, such as described with reference to FIGS. 4A-4B and/or FIGS. 5A-5B. In some examples, determining that the one or more measures of motion of electronic device 101 satisfy one or more criteria can include, for example, determining one or more measures of motion of the electronic device, such as described with reference to FIGS. 4A-4B and/or FIGS. 5A-5B.

In some examples, while displaying the content (e.g., content 442, content 542, etc.) at the first apparent depth and in response to detecting the motion of the electronic device (e.g., electronic device 101), the electronic device can update the display of the content, including displaying the content (e.g., content 446, content 546, etc.) at the subsequent apparent depth (e.g., depth D4, depth D6, etc.), such as described with reference to FIG. 4B and/or FIG. 5B. For example, displaying the content at the subsequent apparent depth based on the detected motion can include displaying the content at increasing depth with increasing magnitude of the one or more measures of motion as well as displaying the content at decreasing depth with decreasing magnitude of the one or more measures of motion, such as described with reference to FIGS. 4A-4B and/or FIGS. 5A-5B.

In some examples, the electronic device 101 can detect the motion of electronic device 101 by comparing the one or more measures of the motion of the electronic device with predetermined threshold(s) and/or one or more characteristics of a motion profile associated with the user, such as described with reference to FIG. 4B and/or FIG. 5B. For example, electronic device 101 can detect the motion of electronic device 101 by implementing any suitable classification algorithm configured to compare, or otherwise identify and/or classify data corresponding to the one or more measures of the motion of electronic device 101. For example, the data corresponding to motion and/or movement patterns of electronic device 101 can include data corresponding to the one or more measures of the motion of electronic device 101, such as described herein. In some examples, the data corresponding to the one or more measures of motion can include, for example, data corresponding to output from one or more motion and/or orientation sensors (e.g., motion and/or orientation sensors 210), data corresponding to motion of electronic device 101 such as in the form of sequences of events, images corresponding to movement pattern(s) associated with the user, and/or the like. For example, the classification algorithm can include one or more machine learning algorithms such as neural networks (e.g., convolutional neural networks), supervised and/or unsupervised machine learning algorithms, and/or the like. Any other suitable technique for comparing and/or classifying the data can be used in accordance with examples of the disclosure.

At 810B, method 800 can include, for example, detecting a change in location of gaze of the user. In some examples, the change in the location of the gaze of the user can be detected while displaying the content, such as described with reference to FIGS. 3A-3D, FIGS. 4A-4B, and/or FIGS. 5A-5B. For example, the change in the location of the gaze of the user can be detected while displaying the content at the first apparent depth or the change in the location of the gaze of the user can be detected while displaying the content at the second apparent depth. In some examples, the change in the location of the gaze of the user can be detected while displaying the content and before a change in motion is detected. For example, the change in the location of the gaze of the user can be detected while displaying the content at the first apparent depth and before detecting motion of the electronic device (e.g., as in at 810A). In some examples, the change in the location of the gaze of the user can be detected while displaying the content after a change in motion is detected. For example, the change in the location of the gaze of the user can be detected while displaying the content at the second apparent depth and after the change in motion is detected (e.g., as in at 810A). In some examples, detecting a change in location of gaze of the user can include, for example, determining, based on a second measure of vergence, a second depth of a second fixation point (e.g., fixation point FP2 of FIG. 3C) different from the first depth of the first fixation point of the user. For example, the second depth of the second fixation point of the user can be determined in a manner such as described with reference to the first fixation point (e.g., fixation point FP1 of FIG. 3A). In some examples, when the motion of the electronic device in the physical environment is detected, method 800 proceeds to 812.

In some examples, the electronic device 101 can detect the change in the location of the gaze of the user by comparing changes in fixation point(s) (e.g., fixation point FP1, fixation point FP2, etc.) and/or depths (e.g., depth D1, depth D2, etc.) of the fixation point(s) of the user with predetermine threshold(s) and/or one or more criteria, such as described with reference to FIGS. 3A-3D. For example, electronic device 101 can detect the change in the location of the gaze of the user by implementing any suitable classification algorithm configured to compare, or otherwise identify and/or classify data corresponding to the one or more measures of the motion of electronic device 101. For example, the data corresponding to the change in the location of the gaze of the user can include data corresponding to respective fixation point(s) (e.g., fixation point FP1, fixation point FP2, etc.) and/or depths (e.g., depth D1, depth D2, etc.) of the fixation point(s) of the user, such as described herein. In some examples, the data corresponding to the change in the location of the gaze of the user and/or the fixation point(s) (e.g., fixation point FP1, fixation point FP2, etc.) and/or depths (e.g., depth D1, depth D2, etc.) of the fixation point(s) can include, for example, data corresponding to output from one or more eye tracking sensors (e.g., one or more eye tracking sensors 212), and/or the like. For example, the classification algorithm can include one or more machine learning algorithms such as neural networks (e.g., convolutional neural networks), supervised and/or unsupervised machine learning algorithms, and/or the like. Any other suitable technique for comparing and/or classifying the data can be used in accordance with examples of the disclosure.

At 812, method 800 can include, for example, updating the displayed content, including updating the content displayed at the first apparent depth or updating the content displayed at the second apparent depth. In some examples, updating the content displayed at the first apparent depth can include, for example, moving content in the three-dimensional environment (e.g., three-dimensional environment 300, three-dimensional environment 400, three-dimensional environment 500, etc.) with or without a delay, such as described with reference to FIGS. 3A-3D.

At 814B, method 800 can include, for example, displaying, via the one or more displays, the content at the second apparent depth different from the first apparent depth and/or the second apparent depth in the computer-generated environment relative to the viewpoint of the user, such as described with reference to FIGS. 3A-3D. In some examples, the content can be displayed at the second apparent depth in accordance with a determination that the change in the location of the gaze satisfies one or more criteria, such as described with reference to FIGS. 3C-3D. For example, the one or more criteria can include a second criterion that is satisfied when a difference between the first depth and the second depth exceeds a predetermined threshold, such as described with reference to FIGS. 3C-3D. For example, the second criterion can include or otherwise correspond to a threshold difference between the depth of a fixation point during a first time period and the depth of a subsequent fixation point during a subsequent time period. In some examples, the second criterion can be determined to have been satisfied when the difference between depth D1 and depth D2 exceeds the predetermined threshold. The determination as to whether or not the change in the location of the gaze satisfies the one or more criteria can otherwise be determined using any suitable means and can be chosen as a matter of design. As another example, determining whether or not the change in the location of the gaze satisfies the one or more criteria can include, for example, comparing a magnitude of a difference between the first depth and the second depth with the predetermined threshold.

In some examples, machine learning algorithms can be applied to the captured images from the image sensor to determine the depth of various physical objects in the physical environment. As another example, the one or more sensors may include gaze detection sensors (e.g., one or more eye tracking sensors 212). The gaze detection sensors may be able to determine the degree of convergence of a user's eyes. High convergence may be indicative of a physical object that is close to the user (e.g., a short depth) whereas low convergence may be indicative of a physical object that is far away from the user (e.g., a far depth). The convergence determined by the gaze detection sensor(s) my therefore be used to estimate the depth of physical objects in the physical environment. As another example, the one or more sensors may include a stereo camera (with two or more lenses and image sensors for capturing three-dimensional images). As yet another example, the one or more sensors may include a depth sensor. The depth sensor may be a pixelated depth sensor (e.g., that is configured to measure multiple depths across the physical environment) or a point sensor (that is configured to measure a single depth in the physical environment). When a point sensor is used, the point sensor may be aligned with the known display direction of the head-locked content in the electronic device (e.g., electronic device 101).

It is understood that method 800 is an example and that more, fewer, or different operations can be performed in the same or in a different order. Additionally, the operations in method 800 described above are, optionally, implemented by running one or more functional modules in an information processing apparatus such as general-purpose processors (e.g., as described with respect to FIG. 2) or application specific chips, and/or by other components of FIG. 2. For example, the functions noted in the depiction of method 800 may occur out of the order noted in the Figures. In some examples, two blocks shown in succession may, in fact, be executed substantially concurrently, or the blocks may sometimes be executed in the reverse order, depending upon the functionality involved. Furthermore, in some examples, each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantageously, method 800 enables the comfortable display of content in a three-dimensional environment in which content is displayed adaptively and in real-time to substantially coincide with a measure of depth of the user's gaze and/or the depth of physical/virtual content located in the environment and in the field of view and/or line of sight of the user. This allows the user to look between their current point of point of fixation and the displayed content more easily, enabling seamless transition in the user's attention between their current point of fixation and the displayed content, thereby requiring minimal effort on the part of the user, and improving the user experience. In some examples, the adaptive display of the content can be configured to adjust the location of the displayed content with a delay so as to avoid rapid changes in the depth of the displayed content, advantageously enabling more comfortable viewing of the content by the user that is less distracting, as well as reducing power consumption. Various additional benefits can also be contemplated.

Therefore, according to the above, some examples of the disclosure are directed to systems and methods for displaying content. The method can be performed at an electronic device in communication with one or more displays and one or more input devices. In some examples, the electronic device can display, via the one or more displays, content at a first apparent depth in a computer-generated environment relative to a viewpoint of a user. Additionally or alternatively to one or more of the examples disclosed above, in some examples, the first apparent depth can be selected in accordance with a measure of a depth of a fixation point of the user during a first time period. Additionally or alternatively to one or more of the examples disclosed above, in some examples, the electronic device can, while displaying the content and in response to detecting motion of the electronic device in a physical environment of the electronic device, update the display of the content, including displaying, via the one or more displays, the content at a second apparent depth different from the first apparent depth in the computer-generated environment relative to the viewpoint of the user.

Additionally or alternatively to one or more of the examples disclosed above, in some examples, the electronic device can display the content at the second apparent depth in accordance with a determination that the motion satisfies one or more criteria. Additionally or alternatively to one or more of the examples disclosed above, in some examples, the one or more criteria include one or more first criteria. Additionally or alternatively to one or more of the examples disclosed above, in some examples, the electronic device can track, via the one or more input devices, eye-movement of a user of the electronic device. Additionally or alternatively to one or more of the examples disclosed above, in some examples, the electronic device can generate, based on the eye-movement of the user, eye-tracking data including an indication of the measure of vergence. Additionally or alternatively to one or more of the examples disclosed above, in some examples, the electronic device can determine, based on the measure of vergence, the depth of the fixation point of the user. Additionally or alternatively to one or more of the examples disclosed above, in some examples, the electronic device can display the content during a second time period subsequent to the first time period.

Additionally or alternatively to one or more of the examples disclosed above, in some examples, the measure of vergence can include a first measure of vergence. Additionally or alternatively to one or more of the examples disclosed above, in some examples, the eye-tracking data can include an indication of a second measure of vergence of the user. Additionally or alternatively to one or more of the examples disclosed above, in some examples, the electronic device can determine, based on the second measure of vergence, a second depth of a second fixation point different from the first depth of the first fixation point of the user. Additionally or alternatively to one or more of the examples disclosed above, in some examples, the electronic device can, while displaying the content and in response to detecting a change in location of gaze of the user from the first fixation point to the second fixation point, update the display of the content, including displaying, via the one or more displays, the content at a third apparent depth different from the second apparent depth in the computer-generated environment relative to the viewpoint of the user. Additionally or alternatively to one or more of the examples disclosed above, in some examples, the electronic device can display the content at the second apparent depth in accordance with a determination that the change in the location of the gaze satisfies one or more second criteria.

Additionally or alternatively to one or more of the examples disclosed above, in some examples, the electronic device can display the content at the second apparent depth in accordance with a determination that the change in the location of the gaze does not satisfy the one or more second criteria. Additionally or alternatively to one or more of the examples disclosed above, in some examples, the one or more second criteria can include a criterion that is satisfied when a difference between the first depth and the second depth exceeds a predetermined threshold. Additionally or alternatively to one or more of the examples disclosed above, in some examples, the one or more criteria can include a criterion that is satisfied when one or more measures of the motion of the electronic device exceeds a predetermined motion threshold. Additionally or alternatively to one or more of the examples disclosed above, in some examples, the predetermined motion threshold corresponds to a predetermined displacement threshold, a predetermined speed threshold, or a predetermined acceleration threshold. Additionally or alternatively to one or more of the examples disclosed above, in some examples, the criterion can be satisfied when the one or more measures of the motion of the electronic device exceeds the predetermined displacement threshold, the predetermined speed threshold, or the predetermined acceleration threshold. Additionally or alternatively to one or more of the examples disclosed above, in some examples, when the criterion is satisfied, a magnitude of the second apparent depth is greater than a magnitude of the first apparent depth, wherein the magnitude of the first apparent depth is below a predetermined threshold distance relative to the viewpoint of the user.

Additionally or alternatively to one or more of the examples disclosed above, in some examples, the electronic device can display the content at the second apparent depth, including determining, based on the second measure of vergence, the second depth of the second fixation point of the user. Additionally or alternatively to one or more of the examples disclosed above, in some examples, the electronic device can display the content at the second apparent depth in accordance with a measure of the second depth of the second fixation point of the user during a time period subsequent to the first time period. Additionally or alternatively to one or more of the examples disclosed above, in some examples, the electronic device can, while displaying the content and in response to detecting motion of the electronic device in a physical environment of the electronic device, update the display of the content, including continuing to display the content at the first apparent depth in the computer-generated environment relative to the viewpoint of the user in accordance with a determination that the motion does not satisfy the one or more criteria.

Additionally or alternatively to one or more of the examples disclosed above, in some examples, the one or more criteria include a criterion that is satisfied when one or more measures of the motion of the electronic device over a predetermined interval corresponds at least partially to a respective motion profile. Additionally or alternatively to one or more of the examples disclosed above, in some examples, the respective motion profile includes a characteristic corresponding to motion of the electronic device along a predetermined path. Additionally or alternatively to one or more of the examples disclosed above, in some examples, the respective motion profile includes a characteristic corresponding to an activity associated with the user. Additionally or alternatively to one or more of the examples disclosed above, in some examples, the electronic device can update the display of the content, including moving the content relative to the viewpoint of the user in the computer-generated environment, wherein the content is moved from the first apparent depth and to the second apparent depth after the second time period. Additionally or alternatively to one or more of the examples disclosed above, in some examples, the electronic device can display the content at the second apparent depth during a third time period. Additionally or alternatively to one or more of the examples disclosed above, in some examples, the content can include head-locked or body-locked content.

Some examples of the disclosure are directed to an electronic device. Additionally or alternatively to one or more of the examples disclosed above, in some examples, the electronic device can include one or more processors, memory, and means for performing the disclosed method. Some examples of the disclosure are directed to non-transitory computer readable storage medium storing one or more programs, the one or more programs comprising instructions, which when executed by one or more processors of an electronic device, cause the electronic device to perform the disclosed method. Some examples of the disclosure are directed to an information processing apparatus for use in an electronic device. Additionally or alternatively to one or more of the examples disclosed above, in some examples, the information processing apparatus can include means for performing the disclosed method. Some examples of the disclosure are directed to an electronic device, comprising: one or more processors; memory; and one or more programs stored in the memory and configured to be executed by the one or more processors, the one or more programs including instructions for performing any of the above methods. Some examples of the disclosure are directed to a non-transitory computer readable storage medium storing one or more programs, the one or more programs including instructions, which when executed by one or more processors of an electronic device, can cause the electronic device to perform any of the above methods.

Some examples of the disclosure are directed to an electronic device, comprising one or more processors, memory, and means for performing any of the above methods. Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method, comprising:

at an electronic device in communication with one or more displays and one or more input devices:

displaying, via the one or more displays, content at a first apparent depth in a three-dimensional environment relative to a viewpoint of a user, wherein the first apparent depth is selected in accordance with a measure of a depth of a fixation point of the user during a first time period; and while displaying the content and in response to detecting motion of the electronic device in a physical environment of the electronic device, updating the display of the content, including:

in accordance with a determination that the motion satisfies one or more criteria, the one or more criteria including a criterion that is satisfied when one or more measures of motion of the electronic device exceed a predetermined displacement threshold, a predetermined speed threshold, or a predetermined acceleration threshold, displaying, via the one or more displays, the content at a second apparent depth different from the first apparent depth in the three-dimensional environment relative to the viewpoint of the user;

wherein the one or more measures of the motion of the electronic device over a predetermined interval correspond at least partially to a respective motion profile, the respective motion profile including at least one of:

a characteristic corresponding to motion of the electronic device along a predetermined path; or a characteristic corresponding to an activity associated with the user.

2. The method of claim 1, further comprising:

tracking, via the one or more input devices, eye-movement of a user of the electronic device;

generating, based on the eye-movement of the user, eye-tracking data including an indication of the measure of vergence; and determining, based on the measure of vergence, the depth of the fixation point of the user.

3. The method of claim 2, wherein the content is displayed during a second time period subsequent to the first time period, the measure of vergence includes a first measure of vergence, and the eye-tracking data includes an indication of a second measure of vergence of the user, the method further comprising:

determining, based on the second measure of vergence, a second depth of a second fixation point different from the depth of the fixation point of the user; and while displaying the content and in response to detecting a change in location of gaze of the user from the fixation point to the second fixation point, updating the display of the content, including:

in accordance with a determination that the change in the location of the gaze satisfies one or more second criteria, displaying, via the one or more displays, the content at a third apparent depth different from the second apparent depth in the three-dimensional environment relative to the viewpoint of the user; and in accordance with a determination that the change in the location of the gaze does not satisfy the one or more second criteria, displaying, via the one or more displays, the content at the second apparent depth.

4. The method of claim 3, wherein displaying, via the one or more displays, the content at the second apparent depth comprises:

determining, based on the second measure of vergence, the second depth of the second fixation point of the user; and displaying, via the one or more displays, the content at the second apparent depth in the three-dimensional environment relative to the viewpoint of the user, wherein the second apparent depth is selected in accordance with a measure of the second depth of the second fixation point of the user during a time period subsequent to the first time period.

5. The method of claim 3, further comprising:

while displaying the content and in response to detecting motion of the electronic device in a physical environment of the electronic device, updating the display of the content, including:

in accordance with a determination that the motion does not satisfy the one or more criteria, continuing to display, via the one or more displays, the content at the first apparent depth in the three-dimensional environment relative to the viewpoint of the user.

6. The method of claim 1, wherein:

when the criterion is satisfied, a magnitude of the second apparent depth is greater than a magnitude of the first apparent depth, wherein the magnitude of the first apparent depth is below a predetermined threshold distance relative to the viewpoint of the user.

7. The method of claim 1, wherein the content comprises head-locked or body-locked content.

8. The method of claim 1, wherein the one or more displays include a head-mounted display.

9. An electronic device comprising:

one or more processors;

memory; and one or more programs stored in the memory and configured to be executed by the one or more processors, the one or more programs including instructions for performing a method comprising:

displaying, via one or more displays, content at a first apparent depth in a three-dimensional environment relative to a viewpoint of a user, wherein the first apparent depth is selected in accordance with a measure of a depth of a fixation point of the user during a first time period; and while displaying the content and in response to detecting motion of the electronic device in a physical environment of the electronic device, updating the display of the content, including:

in accordance with a determination that the motion satisfies one or more criteria, the one or more criteria including a criterion that is satisfied when one or more measures of motion of the electronic device exceed a predetermined displacement threshold, a predetermined speed threshold, or a predetermined acceleration threshold, displaying, via the one or more displays, the content at a second apparent depth different from the first apparent depth in the three-dimensional environment relative to the viewpoint of the user;

wherein the one or more measures of the motion of the electronic device over a predetermined interval correspond at least partially to a respective motion profile, the respective motion profile including at least one of:

a characteristic corresponding to motion of the electronic device along a predetermined path; or a characteristic corresponding to an activity associated with the user.

10. The electronic device of claim 9, wherein the method further comprises:

tracking, via one or more input devices, eye-movement of a user of the electronic device;

generating, based on the eye-movement of the user, eye-tracking data including an indication of the measure of vergence; and determining, based on the measure of vergence, the depth of the fixation point of the user.

11. The electronic device of claim 10, wherein the content is displayed during a second time period subsequent to the first time period, the measure of vergence includes a first measure of vergence, and the eye-tracking data includes an indication of a second measure of vergence of the user, the method further comprising:

determining, based on the second measure of vergence, a second depth of a second fixation point different from the depth of the fixation point of the user; and while displaying the content and in response to detecting a change in location of gaze of the user from the fixation point to the second fixation point, updating the display of the content, including:

in accordance with a determination that the change in the location of the gaze satisfies one or more second criteria, displaying, via the one or more displays, the content at a third apparent depth different from the second apparent depth in the three-dimensional environment relative to the viewpoint of the user; and in accordance with a determination that the change in the location of the gaze does not satisfy the one or more second criteria, displaying, via the one or more displays, the content at the second apparent depth.

12. The electronic device of claim 11, wherein displaying, via the one or more displays, the content at the second apparent depth comprises:

determining, based on the second measure of vergence, the second depth of the second fixation point of the user; and displaying, via the one or more displays, the content at the second apparent depth in the three-dimensional environment relative to the viewpoint of the user, wherein the second apparent depth is selected in accordance with a measure of the second depth of the second fixation point of the user during a time period subsequent to the first time period.

13. The electronic device of claim 11, wherein the method further comprises:

while displaying the content and in response to detecting motion of the electronic device in a physical environment of the electronic device, updating the display of the content, including:

in accordance with a determination that the motion does not satisfy the one or more criteria, continuing to display, via the one or more displays, the content at the first apparent depth in the three-dimensional environment relative to the viewpoint of the user.

14. The electronic device of claim 9, wherein:

when the criterion is satisfied, a magnitude of the second apparent depth is greater than a magnitude of the first apparent depth, wherein the magnitude of the first apparent depth is below a predetermined threshold distance relative to the viewpoint of the user.

15. The electronic device of claim 9, wherein the content comprises head-locked or body-locked content.

16. The electronic device of claim 9, wherein the one or more displays include a head-mounted display.

17. A non-transitory computer readable storage medium storing one or more programs, the one or more programs comprising instructions, which when executed by one or more processors of an electronic device, cause the electronic device to perform a method comprising:

displaying, via one or more displays, content at a first apparent depth in a three-dimensional environment relative to a viewpoint of a user, wherein the first apparent depth is selected in accordance with a measure of a depth of a fixation point of the user during a first time period; and while displaying the content and in response to detecting motion of the electronic device in a physical environment of the electronic device, updating the display of the content, including:

in accordance with a determination that the motion satisfies one or more criteria, the one or more criteria including a criterion that is satisfied when one or more measures of motion of the electronic device exceed a predetermined displacement threshold, a predetermined speed threshold, or a predetermined acceleration threshold, displaying, via the one or more displays, the content at a second apparent depth different from the first apparent depth in the three-dimensional environment relative to the viewpoint of the user;

wherein the one or more measures of the motion of the electronic device over a predetermined interval correspond at least partially to a respective motion profile, the respective motion profile including at least one of:

a characteristic corresponding to motion of the electronic device along a predetermined path; or a characteristic corresponding to an activity associated with the user.

18. The non-transitory computer readable storage medium of claim 17, wherein the method further comprises:

tracking, via one or more input devices, eye-movement of a user of the electronic device;

generating, based on the eye-movement of the user, eye-tracking data including an indication of the measure of vergence; and determining, based on the measure of vergence, the depth of the fixation point of the user.

19. The non-transitory computer readable storage medium of claim 18, wherein the content is displayed during a second time period subsequent to the first time period, the measure of vergence includes a first measure of vergence, and the eye-tracking data includes an indication of a second measure of vergence of the user, the method further comprising:

determining, based on the second measure of vergence, a second depth of a second fixation point different from the depth of the fixation point of the user; and while displaying the content and in response to detecting a change in location of gaze of the user from the fixation point to the second fixation point, updating the display of the content, including:

in accordance with a determination that the change in the location of the gaze satisfies one or more second criteria, displaying, via the one or more displays, the content at a third apparent depth different from the second apparent depth in the three-dimensional environment relative to the viewpoint of the user; and in accordance with a determination that the change in the location of the gaze does not satisfy the one or more second criteria, displaying, via the one or more displays, the content at the second apparent depth.

20. The non-transitory computer readable storage medium of claim 19, wherein displaying, via the one or more displays, the content at the second apparent depth comprises:

determining, based on the second measure of vergence, the second depth of the second fixation point of the user; and displaying, via the one or more displays, the content at the second apparent depth in the three-dimensional environment relative to the viewpoint of the user, wherein the second apparent depth is selected in accordance with a measure of the second depth of the second fixation point of the user during a time period subsequent to the first time period.

21. The non-transitory computer readable storage medium of claim 19, wherein the method further comprises:

while displaying the content and in response to detecting motion of the electronic device in a physical environment of the electronic device, updating the display of the content, including:

in accordance with a determination that the motion does not satisfy the one or more criteria, continuing to display, via the one or more displays, the content at the first apparent depth in the three-dimensional environment relative to the viewpoint of the user.

22. The non-transitory computer readable storage medium of claim 17, wherein:

when the criterion is satisfied, a magnitude of the second apparent depth is greater than a magnitude of the first apparent depth, wherein the magnitude of the first apparent depth is below a predetermined threshold distance relative to the viewpoint of the user.

23. The non-transitory computer readable storage medium of claim 17, wherein the content comprises head-locked or body-locked content.

24. The non-transitory computer readable storage medium of claim 17, wherein the one or more displays include a head-mounted display.

* * * * *